United States Patent
Olejar, Jr. et al.

(10) Patent No.: US 12,452,369 B1
(45) Date of Patent: Oct. 21, 2025

(54) AGENTIC AI EMERGENCY RESPONSE ANALYTICS

(71) Applicant: RAPIDSOS, INC., New York, NY (US)

(72) Inventors: James Patrick Olejar, Jr., Fort Lauderdale, FL (US); Michael Martin, Long Island City, NY (US); Martin Vejmelka, Prague (CZ); Zachery LaValley, Arlington, MA (US)

(73) Assignee: RAPIDSOS, INC., New York, NY (US)

( * ) Notice: Subject to any disclaimer, the term of this patent is extended or adjusted under 35 U.S.C. 154(b) by 0 days.

(21) Appl. No.: 19/224,682

(22) Filed: May 30, 2025

(51) Int. Cl.
*G06F 3/0482* (2013.01)
*G06F 16/248* (2019.01)
*H04M 3/51* (2006.01)

(52) U.S. Cl.
CPC ......... *H04M 3/5116* (2013.01); *G06F 3/0482* (2013.01); *G06F 16/248* (2019.01)

(58) Field of Classification Search
CPC ... G06F 3/0482; G06F 16/248; H04M 3/5116
See application file for complete search history.

(56) References Cited

U.S. PATENT DOCUMENTS

| | | | | |
|---|---|---|---|---|
| 12,333,612 | B2 * | 6/2025 | Thompson | G06Q 40/08 |
| 2012/0218102 | A1 * | 8/2012 | Bivens | G08B 25/003 |
| | | | | 340/539.11 |
| 2014/0155018 | A1 * | 6/2014 | Fan | H04W 72/51 |
| | | | | 455/404.1 |
| 2020/0334470 | A1 * | 10/2020 | Abeykoon | G06V 10/96 |
| 2021/0352460 | A1 * | 11/2021 | Rohde | G06F 40/284 |
| 2022/0383998 | A1 * | 12/2022 | Cossler | G16H 50/50 |
| 2023/0014517 | A1 * | 1/2023 | Martin | H04M 3/5133 |
| 2023/0319180 | A1 * | 10/2023 | Manzanillo | G06F 16/90332 |
| | | | | 455/404.2 |
| 2024/0304315 | A1 * | 9/2024 | Bhansali | G16H 50/30 |

* cited by examiner

*Primary Examiner* — Anil K Bhargava
(74) *Attorney, Agent, or Firm* — William J. Pigott; Michael L. Ross

(57) ABSTRACT

An emergency response data system (ERDS) integrates an AI agent into an emergency management application to generate emergency response analytics to facilitate operational efficiency of one or more ECCs. The ERDS provides an emergency management application operable by an emergency communications center (ECC) computing system to display an emergency management user interface (UI) at one or more ECC. The ERDS stores, in one or more data structures, historical emergency response analytics. The ERDS receives, with the emergency management UI, user instructions related to the historical emergency response analytics. The ERDS provides the user instructions to the emergency response AI agent. The ERDS generates, with the AI agent, textual or visual representations of the historical emergency response analytics in response to the user instructions. The ERDS displays, with the emergency management UI, the textual or visual representations of the historical emergency response analytics to facilitate operational efficiency of ECCs.

29 Claims, 23 Drawing Sheets

INSTRUCTIONS 1000

1002

YOU ARE AN AI ASSISTANT THAT ANALYZES 911 CALL-CENTER DATA. YOU ARE AN EXPERT AT ANSWERING USER QUERIES
IN PARTICULAR USING THE XYZ QUERY DIALECT.

THE CURRENT DATE IS: {{CURRENT_DATE}}

...

NENA 911 PERFORMANCE METRICS & TARGETS
• TOTAL CALLS TOTAL INCOMING CALLS
• ANSWERED CALLS CALLS ANSWERED BY AN OPERATOR
• ABANDONED CALLS CALLS ABANDONED BEFORE ANSWER
• TRANSFERRED CALLS CALLS TRANSFERRED ELSEWHERE
• AVERAGE CALL DURATION AVERAGE DURATION OF HANDLED CALLS

• AVERAGE ANSWER TIME AVERAGE ANSWER TIME (SEC)
• CALLS ANSWERED IN 10 SECONDS OR LESS % CALLS ANSWERED = 10 S (TARGET = 90 %)

PLEASE MAKE SURE TO:
1. ENSURE TABLE NAMES ARE CORRECT
2. USE SQL-COMPATIBLE DATE FUNCTIONS (E.G., USE DATE_SUB(CURRENT_DATE, 7) INSTEAD OF DATE_SUB(CURRENT_DATE(), INTERVAL '7' DAY))
3. PROPERLY FORMAT YOUR RESPONSE
4. USE CORRECT COLUMN NAMES IF YOU CREATE CTES, SUBQUERIES, OR ALIASES

INSTRUCTIONS 1100

```
YOU ARE AN INTELLIGENT ANALYST ASSISTANT HELPING A {{ROLE}}.            —1104

THE USER ORIGINALLY ASKED:
"{{ORIGINAL_USER_MESSAGE}}"

HERE IS THE SQL YOU EXECUTED *INTERNALLY* (DO NOT REVEAL THIS TO
THE USER):                                                              1106
```SQL
{{SQL_QUERY}}
```

THE QUERY RETURNED THESE ROWS: {{QUERY_RESULTS}}

PRODUCE A JSON OBJECT WITH ONE OF THE FOLLOWING STRUCTURES
BASED ON THE DATA:

1?. SINGLE METRIC:
{
  "RESPONSE": "<1-2 SENTENCE FACTUAL STATEMENT ABOUT THE DATA WITH
EXPLICIT COMPARISON TO NENA TARGET>",                                   1108
  "ANALYSIS": {
    "TYPE": "METRIC_CARD",
    "TITLE": "<SHORT LABEL>",
    "VALUE": <NUMBER OR STRING>
  }
}

...

CHART SELECTION:
• ALWAYS USE LINE CHART FOR HISTORICAL/TIME-SERIES DATA (DATA WITH
DATES)
• USE BAR CHART FOR CATEGORICAL COMPARISONS (COMPARING
DIFFERENT CATEGORIES)
• USE PIE CHART FOR DISTRIBUTIONS (SHOWING PARTS OF A WHOLE)            1110

DATA PROCESSING RULES:
• ROUND ALL NUMERIC VALUES TO 2 DECIMAL PLACES (HUNDREDTHS)
• CAREFULLY ANALYZE DATA BEFORE MAKING CLAIMS ABOUT MEETING TA
```

INSTRUCTIONS 1100

AGENTIC AI EMERGENCY RESPONSE ANALYTICS

TECHNICAL FIELD

This disclosure relates generally to emergency management systems, and in particular to providing real-time suggestions to emergency management and response personnel.

BACKGROUND

In the critical moments following an emergency, rapid and accurate information dissemination is paramount for effective response. Emergency communication centers (ECCs), such as 911 call centers, serve as vital hubs for receiving initial reports and coordinating the dispatch of first responders. Similarly, operations centers (OCs), like global security operations centers (GSOCs) or railway network operations centers (NOCs), manage incidents within their specific domains. First responders, including firefighters, police officers, and emergency medical technicians, rely on timely and relevant information to navigate to the scene, assess the situation, and implement appropriate actions.

The ability of emergency personnel to quickly understand the nature of the emergency, the location, and any potential hazards significantly impacts response times and the safety of both the public and the responders. Traditional emergency response workflows often involve manual information gathering and dissemination, which can be time-consuming and prone to human error, particularly under the high-pressure conditions inherent in emergency situations. Furthermore, the increasing volume and diversity of data sources related to emergencies, such as sensor data from smart devices, telematics information from vehicles, and real-time environmental conditions, present both opportunities and challenges for efficient analysis and utilization. The effective integration and intelligent processing of this disparate information hold the key to enhancing situational awareness and optimizing emergency response strategies.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 10 illustrates an example diagram of instructions provided to aspects of an emergency response AI agent, in accordance with embodiments of the disclosure.

FIGS. 11A and 11B illustrate example diagrams of instructions provided to aspects of an emergency response AI agent, in accordance with embodiments of the disclosure.

DETAILED DESCRIPTION

Figure 1A:
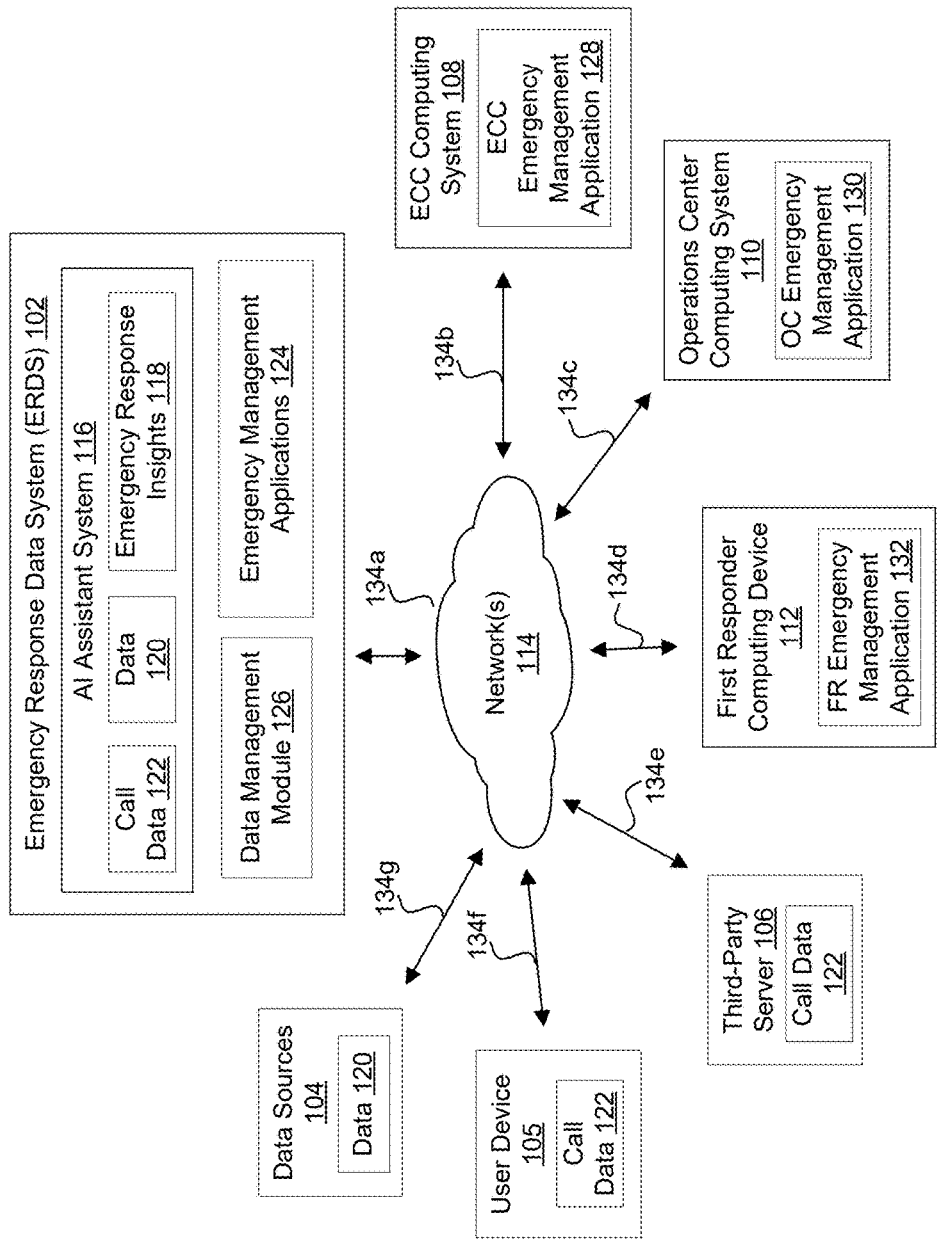
FIGS. 1A and 1B illustrate example diagrams of an emergency response digital assistant system, in accordance with embodiments of the disclosure.

Various aspects of the disclosure include methods and systems for providing agentic artificial intelligence (AI) emergency response analytics. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A public emergency services agency may be established to provide a variety of services. A public emergency services agency can include a 911 call center, a railway network operations center (NOC), a primary call center, a secondary call center (e.g., that receives calls from or routes calls to a primary call center), and the like. A public emergency services agency may be referred to as an emergency service provider (ESP) or an emergency communications center (ECC). One type of ESP or ECC is a public safety answering point (PSAP). A PSAP is another name for a 911 call center that receives emergency calls and dispatches emergency (first) responders in response to the emergency communications (e.g., calls, text, or video messages to 911).

As used herein, a first responder may refer to a firefighter, an emergency medical technician, a paramedic, a police officer, a peace officer, an emergency medical dispatcher, a search and rescue team member, a hazardous materials (HazMat) responder, volunteer emergency workers, and/or public health officials. The systems, processes, and overall technologies disclosed herein may be applicable or implemented for one or more of the various types of first responders, despite some specific examples being directed to firefighters and/or medical service providers for illustrative purposes.

A problem that exists in the emergency response industry is understanding emergency response data statistics and call handling efficiencies at ECCs. Without being able to identify existing trends or forecast future trends for emergency calls made to an ECCs, ECC directors struggle to properly staff call centers with telecommunicators and dispatchers. To properly staff call centers, funding has to be justified and requested for each position, under-performers need to be identified, training for under-performers needs to be delivered, and adequate numbers of staff need to be assigned during appropriate days and times. Addressing these and other challenges, embodiments of the present disclosure include an AI assistant system that integrates one or more emergency response AI agents into emergency response applications to analyze emergency response data and generate analytics and insights into the emergency response data.

Embodiments of the disclosure include an emergency response data system that receives emergency response data (e.g., real-time 911 call locations, telematics data, smart building sensor data) and provides insights and analytics for the emergency response data in one or more emergency management applications that are operated by an ECC, GSOC, and/or first responder device. The emergency response data system may include an AI assistant system that is operable to leverage agentic AI technologies and architectures to generate insights and analytics and/or to perform actions (e.g., dispatch services, request resources, display charts, etc.). As used herein, insights may include suggestions, notifications, messages, and/or options.

The AI assistant system may be configured to support a number of features. Some of the features include, but are not limited to, AI-generated query completion, action suggestions, call taker question suggestions, AI-generated query persistence (e.g., for dashboards), interactive AI-driven action buttons (e.g., to generate analytics charts), an analytics agent that supports conversational user interfaces (UIs), smart analytics buttons (e.g., auto-insights button), forecasting and predictive analytics, real-time alerts (e.g., of anomalies or patterns as they occur), report generation (e.g., saved queries that generate FCC-compliant reports), voice-based interactions with AI agents for real-time querying and response reception, and quality assurance (QA)-based AI improvements based on call taker audio analysis.

The AI assistant system is configured to leverage agentic AI to reduce latencies between an emergency occurring and the arrival of first responders at the location of the emergency, according to one embodiment of the disclosure. As used herein, "agentic AI" refers to the underlying principles and the resulting capabilities of AI systems designed with a high degree of agency, and "AI agent" refers to a specific instance of an autonomous system that may be, for example, under the umbrella of agentic AI.

The AI system may be implemented using one or more AI agents, LLMs (large language models), RAG (retrieval, augmentation, and generation) systems/architectures, and/or combinations thereof. While LLMs are typically implemented for strengths at understanding and generating human-like text, AI agents can be implemented to perform tasks that go beyond language, such as making decisions and interacting with systems or the physical world. In accordance with embodiments of the disclosure, emergency response AI agents may build upon LLMs by adding the instructions and/or logic to autonomously execute actions and workflows to support emergency management and response. As such, emergency response AI agents may be operable to perceive the emergency response environment, make decisions, and execute actions (e.g., provide suggestions, notifications, etc.) autonomously or semi-autonomously.

In one embodiment, the AI assistant system is implemented with a code generation AI agent configured to perform retrieval from one or more data stores (e.g., tables, databases, data structures, etc.). A user prompt is received in a (e.g., conversational) user interface (e.g., by a conversational AI agent), the user prompt is provided to the code generation AI agent, the code generation AI agent generates SQL instructions from tables in system prompt instructions, one or more LLM tools (used by the code generation AI agent) uses the SQL instructions to execute a Databricks® tool, the results from the Databricks® tool are analyzed by the one or more LLM tools, and the conversational AI agent provides the results back to the user. While SQL is specifically cited, it is to be understood that other query languages may be used in the alternative. While Databricks® is specifically cited, it is to be understood that other AI suites of tools (e.g., Amazon SageMaker®, Google Cloud Vertex AI®, Azure Synapse Analytics®, Domino Data Lab®, Apache Spark®, etc.) may be used in the alternative.

The disclosed systems and methods transform the technological area of emergency response management. For example, the disclosed emergency response data system, AI assistant system, and/or AI agent implementations may advantageously: enhance emergency response data analysis and insights; support the optimization of resource allocation and staffing in ECCs, GSOCs, and/or first responder stations; streamline emergency response workflows; enhance situational awareness and support faster emergency response times; and effectuate near-continuous improvement through quality assurance feedback loops.

Enhancing emergency response data analysis and insights may advance the technological area of emergency response management in several ways. Enhancing emergency response data analysis and insights may include providing real-time trend identification and forecasting, which enables proactive resource allocation to reduce ECC overstaffing (i.e., overspend) or understaffing (i.e., prolong emergency response). Enhancing emergency response data analysis and insights may include an "analytics agent" with a conversational UI that allows users to ask natural language questions about the data and receive AI-driven insights—making data exploration more intuitive and usable. Enhancing emergency response data analysis and insights may enable ECC directors to save time and ensure compliance through AI-driven report generation.

As an illustrative example, a user of the AI assistant system may provide the query or prompt, "Give me a report for city council on ECC performance this past month." In response, the AI assistant system may provide key metrics, retrieve weather data from an external data source (e.g., a weather service), and also provide commentary, such as "on Wednesday and Thursday we missed 911 answer times because of a snowstorm that led to challenging travel conditions and a 45% increase in 911 traffic above baseline."

The disclosed AI assistant system is operable to transform emergency response management from a reactive to a more proactive, data-driven, and efficient operation. By leveraging the power of AI agents and agentic AI principles, the AI assistant system may support ECCs, operations centers, and first responders with the insights and tools that may enable faster, more informed decisions, and that may ultimately lead to better outcomes in emergency situations. Various embodiments of the disclosure are described hereafter and represented in FIGS. 1A-11B.

Figure 1B:
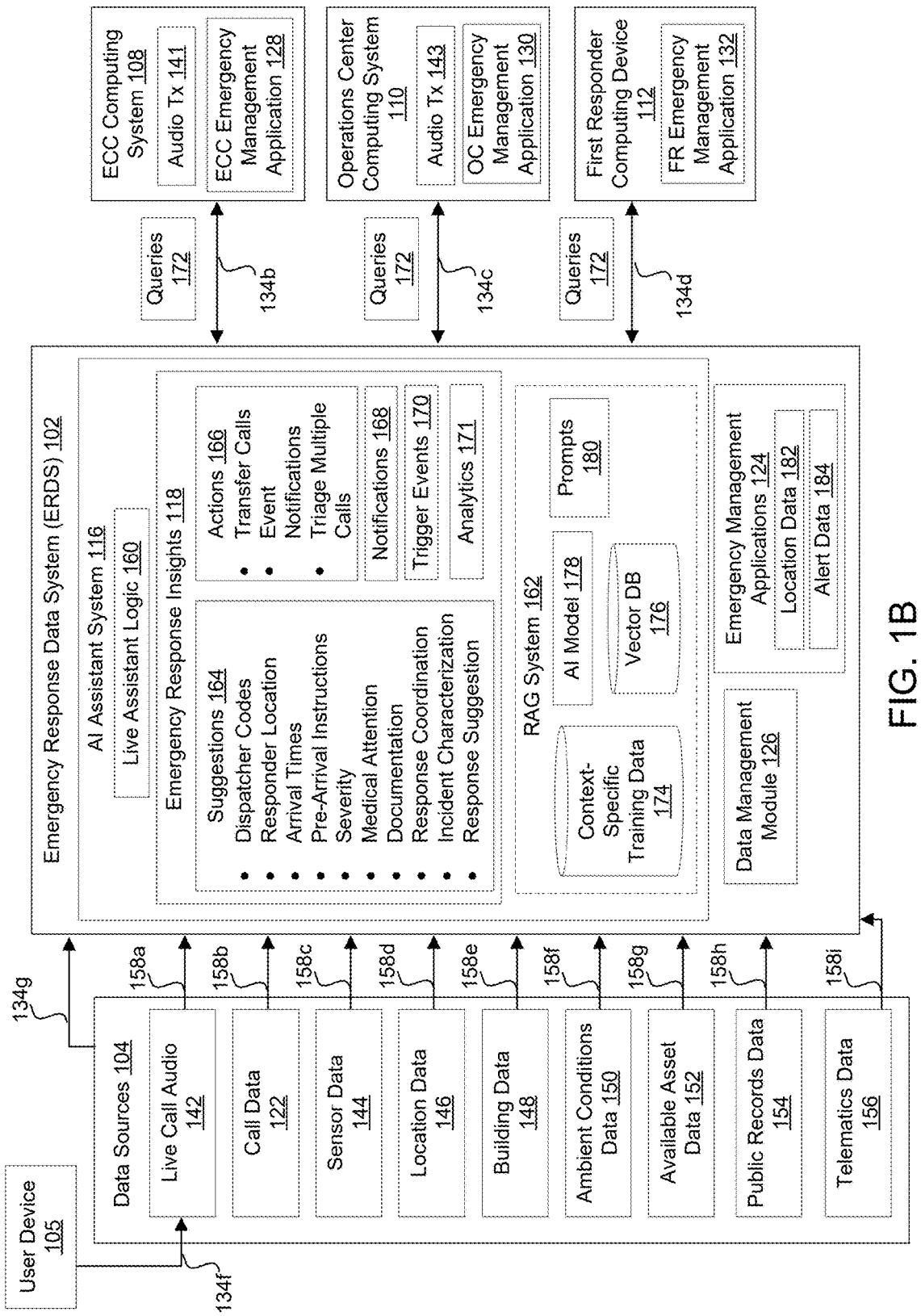

FIGS. 1A and 1B illustrate example embodiments of an emergency response digital assistant system that is configured to aggregate information from a number of data sources, analyze the information, and generate emergency response insights for emergency management personnel and emergency responders, in accordance with aspects of the disclosure. Currently, the latency inherent in human-operated detection and response protocols marks a critical bottleneck in mitigating emergency situations. FIG. 1A illustrates a diagram of an emergency response digital assistant system 100 that includes an emergency response data system (ERDS) 102 that is communicatively coupled to a number of data sources 104, a user device 105, a third-party server 106, an ECC computing system 108, an operations center (OC) computing system 110, and/or a first responder computing device 112 through one or more networks 114, according to an embodiment. Networks 114 may include a number of wired networks, wireless networks, network components, and infrastructure. A number of communications channels 134 (individually, 134a, 134b, 134c, 134d, 134e, 134f, and 134g) may communicatively couple the various components of emergency response digital assistant system 100.

Emergency response data system 102 includes an artificial intelligence (AI) assistant system 116 that is configured to generate emergency response insights 118 from data 120 and call data 122, according to an embodiment. AI assistant system 116 is operable to determine characteristics of call data 122 and aggregate the characteristics with data 120, according to an embodiment. AI assistant system 116 is operable to analyze the aggregated characteristics and data 120 to generate emergency response insights 118, according to an embodiment. AI assistant system 116 and/or emergency response data system 102 may then provide emergency response insights 118 to ECC computing system 108, operations center computing system 110, and/or first responder computing device 112 for receipt by emergency responders and/or emergency management personnel.

Emergency response data system 102 is configured to host and/or support a number of emergency management applications 124 that are accessed by and/or operated by ECC computing system 108, operations center computing system 110, and/or first responder computing device 112, according to embodiments of the disclosure. Emergency response data system 102 may be implemented with one or more servers that may be distributed across multiple data centers. Emergency management applications 124 may be implemented on/in emergency response data system 102 as web-based applications that are accessed via a web browser, a webhook, a persistent webhook, and/or one or more secure connections. Emergency management applications 124 may be configured to process and push (and receive) data to a mobile application or an operating system (OS) specific application that is downloaded to and operated by a particular computing system or device (e.g., a first responder smart phone). Data 120 and call data 122 may be retrieved, received, managed, and directed to AI assistant system 116 and emergency management applications 124 with a data management module 126 to support generating and delivering emergency response insights 118.

The various computing systems that receive emergency response insights 118 are tools that may be used by emergency response personnel and emergency responders to dispatch, communicate about, and respond to incidents and emergencies that are represented by or in data 120 and/or call data 122, according to an embodiment. ECC computing system 108 represents a computing system (e.g., a terminal, a server, a personal computer, a laptop, etc.) operated at or for an ECC. ECC computing system 108 is configured to operate or provide an ECC emergency management application 128. ECC emergency management application 128 may be communicatively coupled to emergency response data system 102 to receive emergency response insights 118, data 120, and/or call data 122. ECC emergency management application 128 may be configured with a graphical user interface to visually represent emergency events and incidents (e.g., using maps, queues, icons, data cards, etc.) and to enable emergency response personnel (e.g., 911 dispatchers, telecommunicators, etc.) to dispatch and communicate emergency events.

Operations center computing system 110 represents a computing system (e.g., a terminal, a server, a personal computer, a laptop, etc.) operated at or for an operations center (e.g., a global operations security center (GSOC), a rail network operations center (NOC), etc.). Operations center computing system 110 is configured to operate or provide an operations center emergency management application 130. The operations center emergency management application 130 provides a graphical user interface to enable emergency response personnel (e.g., an operator, risk manager, security personnel, etc.) of corporations, other businesses, residences, academic institutions, and/or private entities to have awareness of incidents (e.g., emergency events) that occur on their particular premises or managed premises.

First responder computing device 112 is representative of computing systems, mobile devices, and/or in-vehicle devices used by emergency responders to navigate to, coordinate for, and communicate about emergency events and other incidents, according to an embodiment. First responder emergency management application 132 may be operated on or by first responder computing device 112. First responder emergency management application 132 is communicatively coupled to emergency response data system 102 to receive emergency response insights 118, data 120, and/or call data 122 to inform the preparation and response to emergency events, according to an embodiment.

User device 105 may include a telephone, a smart phone, tablet, a laptop, personal computer, a chrome book, or other computing devices that may be used, to initiate an emergency call (e.g., a 911 call) or to otherwise report an incident, according to an embodiment. Call data 122 represents audio data, video, data, images, multimedia messages, and/or text messages provided from user device 105 to ECC computing system 108 and/or operations center computing system 110, according to an embodiment.

Third-party server 106 may include a telecommunications or device manufacturer server that receives location data, user identification data, and/or call statistics for emergency calls made by user device 105. Third-party server 106 may be configured to provide call data 122 to emergency response data system 102 to support operation of emergency applications 124, according to an embodiment.

FIG. 1B illustrates an example block diagram of an emergency response digital assistant system 140 and is representative of an example implementation of emergency response digital assistant system 100, in accordance with aspects of the disclosure.

Data sources 104 may include one or more of a number of data types and data sources that may be used to identify, characterize, analyze or otherwise gain insights about emergency events and other incidents, according to an embodiment. Examples of data sources 104 include, but are not limited to, live call audio 142, call data 122, sensor data 144, location data 146, building data 148, ambient conditions data 150, available asset data 152, public records data 154, and telematics data 156, according to an embodiment. Live call audio 142 may be received by emergency response data system 102 by configuring a call audio transmitter 141 to forward/provide live call audio 142 from ECC call handling equipment (e.g., from ECC computing system 108) and/or by configuring call audio transmitter 143 to forward/provide live call audio 142 from GSOC/NOC call handling equipment (e.g., from operations center computing system 110), for example. Live call audio 142 may also include radio-based dispatches or transcripts of radio-based dispatches of emergencies from an ECC. Call data 122 may include call duration, caller name, repeat call statistics, etc. of a call to an ECC or operations center. Sensor data 144 may include, but is not limited to, data received or retrieved from residential buildings, commercial buildings, personal medical devices, personal safety devices, industrial structures, vehicles, crash detectors, smoke alarms, fire alarms, smart cameras, home security devices, moisture detectors, motion detectors, shock detectors, location sensors, gas detectors, pressure sensors, or the like, according to various embodiments of the disclosure. Location data 146 may include a location of a sensor or incident. Building data 148 may include construction materials, structure age, floorplans, renovation history, electrical schematics, HVAC layout, or the like. Ambient conditions data 150 may include weather data, weather forecasts, road conditions, wind speeds, visibility, cloud conditions, temperature, or the like. Available asset data 152 may include, but is not limited to, a number of available drones, a number of available medical devices (e.g., automated external defibrillator), a number of vehicles, a number of sprinklers in a building, or the like. Public records data 154 may include, but are not limited to, personal property records, arrest records, residential addresses, etc. Telematics data 156 may include various types of vehicle data, such as accelerometer data, gyroscope data, air bag sensors, vehicle log data, or the like. Additional miscellaneous data source or data types may include social media feeds, new feeds, geofence data, traffic feeds, visual impairment status, auditory impairment status, or the like. The various data sources 104 may be communicatively coupled to emergency response data system 102 through a number of communications channels 158 (individually, 158*a*, 158*b*, 158*c*, 158*d*, 158*e*, 158*f*, 158*g*, 158*h*, and 158*i*), according to embodiments of the disclosure.

AI assistant system 116 may include a number of components to support generating emergency response insights 118 for display by one or more of ECC emergency management application 128, operations center emergency management application 130, and/or first responder emergency management application 132, according to an embodiment. AI assistant system 116 may include live assistant logic 160 and retrieval, augmentation, generation (RAG) system 162 to generate emergency response insights 118 based on call data 122, data sources 104, and trigger events 170, according to an embodiment.

Emergency response insights 118 may include suggestions 164, actions 166, and/or notifications 168 that are generated in response to one or more trigger events 170, according to an embodiment. Emergency response insights 118 may also include analytics 171 that represent emergency communications statistics handled by an ECC, an operations center, and/or a first responder computing device at a particular location, for a region, and/or for a state or country. Suggestions 164 may be displayed or transmitted to emergency applications 124 to provide summaries, suggested actions, additional awareness, or other insights to a dispatcher, telecommunicator, emergency management operator, or first responder, according to an embodiment. Suggestions 164 may include, but are not limited to, 911 dispatcher codes, responder location, arrival times, pre-arrival instructions for first responders, severity of an incident, live updates to incidents (based on live audio analysis and/or sensor data), medical procedures, documentation (e.g., standard operating procedures), response coordination, incident, characterization, and/or response suggestions, in accordance with various embodiments of the disclosure. Suggestions 164 may also include AI generated search terms and/or search phrases that are based on historical context of a particular user, spatial context, and/or temporal context, for example. Suggestions 164 may also include suggested actions, such as show traffic layer, dispatch to a particular location, display video feed layer, provide estimated time of arrival (ETA) of first responders, or other selectable actions. Emergency response data system 102 may cause one or more suggestions 164 to be displayed on a user interface of ECC emergency management application 128, operations center emergency management application 130, and/or first responder emergency management application 132, according to various embodiments of the disclosure.

Actions 166 are examples of actions that AI assistant system 116 may, in coordination with emergency response data system 102, initiate to facilitate a response to an emergency event. Actions 166 may include, but are not limited to, transfer calls (e.g., to an ECC having jurisdictional authority for a call), triage multiple calls (e.g., group, associate, combine, or summarize), call a point of contact (e.g., at a business location of an incident), search for a phone number of a point of contact, and/or generate a group chat or a group video conference between people who are located near or who are responding to a particular incident, according to various implementations of the disclosure.

Notifications 168 may include informational content or alerts derived from a combination of the trigger events 170, live call audio 142, or other data sources 104, in accordance with aspects of the disclosure. Notifications 168 may include displaying particular insights about one or more related incidents, information about changes to an incident (e.g., a change of location, nature of a fire, number of victims, etc.), available asset updates, or the like.

Trigger events 170 include events that may serve to initiate the aggregation of data sources 104, analysis of data sources 104, and/or the generation of emergency response insights 118, according to an embodiment. Examples of trigger events 170 may include, but are not limited to, a 911 call, a call to a rail NOC, a call to a GSOC, a text message to 911, a text message to a rail NOC, initiating a videoconference with 911, an activated alarm, a change in sensor data, a change in ambient condition data 150 (e.g., an abnormal increase or decrease in temperature or moisture in a space), receipt of a query 172 from ECC computing system 108, receipt of a query 172 from an operations center computing system 110, or receipt of a query from first responder computing device 112, according to embodiments of the disclosure.

Analytics 171 include various metrics for communications occurring at an ECC, a region of ECCs, a state of ECCs, one or more operations centers, and/or one or more other first responder devices or stations, in accordance with aspects of the disclosure. The metrics can cover areas such as call handling, resource management, and overall operational efficiency. The metrics may also include call answer times, abandonment rates, average handling time, and call volume trends to ensure service levels are being met and identify potential bottlenecks in the system. The metrics may also include incident response times and resource allocation to gauge the efficiency of emergency response coordination. As disclosed herein, AI assistant system 116 may include one or more AI agents that may be configured to generate visualizations (e.g., charts, graphs, etc.) based on underlying context data, natural language questions, historical datasets, and/or forecasts.

Live assistant logic 160 include instructions, scripts, and/or one or more processes that support operations of AI assistant system 116, according to an embodiment. For example, live assistant logic 160 may be configured to communicate with data management module 126 to receive data for processing. Live assistant logic 160 may be configured to provide generated emergency response insights 118 to emergency management applications 124, for example. Live assistant logic 160 may include or provide various application programming interfaces (API) to facilitate receipt of query 172, according to an embodiment. Live assistant logic 160 may include decision trees, flow diagrams, instructions, one or more AI agents, one or more large language models (LLMs), or other processes to support a live (real-time) interactions with human operators (e.g., dispatcher, telecommunicator, operations center operator, first responder, etc.), according to an embodiment. Live assistant logic 160 may be configured to at least partially perform one or more of processes 250, 270, 370, and/or 450, in accordance with aspects of the disclosure.

RAG system 162 is an architecture that is configured to support the retrieval, augmentation, and generation of emergency response data that is at least partially based on context specific training data 174, according to an embodiment. A RAG AI system is an example type of AI system that may be included in AI assistant system 116. In some embodiments, AI assistant system 116 includes one or more AI agents, hybrid search capabilities, and/or a RAG system. RAG system 162 includes context-specific training data 174, a vector database 176, an AI model 178, and prompts 180, according to an embodiment. Advantageously, RAG system 162 ingests a wide swath of publicly available information, is further refined with specific local or private (e.g., 911, GSOC-specific, etc.) protocols, and actively surfaces relevant and specific pieces of information to the call taker or first responder in real-time.

Context-specific training data 174 includes information that RAG system 162 and/or AI assistant system 116 can specifically analyze, retrieve, and/or regurgitate to generate emergency response insights 118 that are relevant to a particular emergency call or trigger events 170. Context-specific training data 174 can include standard operating procedures, images, historical transcripts, historical ECC analytics, automotive manuals, appliance manuals, first aid procedures, poison control information, evacuation routes, application programming interface (API) calls to sources like weather and traffic, and other manuals, for example. AI assistant system 116 is operable to retrieve and display specific relevant (e.g., semantically similar) portions of context-specific training data 174 for integration into emergency response insights 118 and/or for display by ECC computing system 108, operations center computing system 110, and/or first responder computing device 112, according to an embodiment.

Context-specific training data 174 includes dispatcher determinant code definitions used by AI model 178 to determine a particular emergency protocol number based on characteristics of the trigger events 170, live call audio 142, and/or other data sources 104, according to an embodiment. AI model 178 (e.g., machine learning models, deep learning models, LLMs, multimodal models, hybrid AI models, etc.) is configured to analyze vector database 176, trigger events 170, live call audio 142, and/or other data sources 104 to generate the dispatcher determinant code that can be displayed as an emergency response insight 118, according to an embodiment. The dispatcher determinant code definitions may align with the Medical Priority Dispatch System (MPDS) definitions or another codification of emergencies. The dispatcher determinant codes may include three components: a chief complaint number, a priority level, and a suffix that indicates specific conditions or additional information. The determinant codes may include: a chief complaint number (ranging from 1 to 33 in the MPDS); a priority level (Alpha, Bravo, Charlie, Delta, Echo); and a suffixed letter or special indicators that apply to special circumstances, e.g., "E" for Echo-level or "C" for cardiac arrest, for example. A few illustrative examples (of many possible definitions) of chief complaint numbers and their related codes in the MPDS may include, but are not limited to:

Abdominal Pain/Problems—Chief Complaint: 1
Example Codes:
  1-A (Alpha-level): Minor abdominal pain, non-life-threatening.
  1-D (Delta-level): Severe abdominal pain with life-threatening conditions.
Allergies (Reactions)/Stings—Chief Complaint: 2
Example Codes:
  2-B (Bravo-level): Allergic reaction without respiratory distress.
  2-D (Delta-level): Anaphylaxis or severe reaction, life-threatening.
Animal Bites/Attacks—Chief Complaint: 3
Example Codes:
  3-A (Alpha-level): Minor animal bite, stable.
  3-D (Delta-level): Severe injuries from an animal attack.
Assault/Sexual Assault—Chief Complaint: 4
Example Codes:
  4-B (Bravo-level): Non-life-threatening injuries.
  4-D (Delta-level): Serious traumatic injury.
Examples of priority levels may include, but are not limited to:
  Alpha (A): Low priority, typically no lights and sirens required.
  Bravo (B): Moderate priority, lights and sirens may be used.
  Charlie (C): High priority, lights and sirens.
  Delta (D): Highest priority, full emergency response.
  Echo (E): Life-threatening, requiring immediate resuscitation (cardiac arrest).
Commonly used suffix letters may include, but are not limited to:
  E: Echo-level (typically indicates life-threatening conditions, such as cardiac or respiratory arrest).
  C: Critical condition such as cardiac arrest.
  X: Used in some systems to designate certain circumstances or injuries.

Vector database 176 is operable to store vectors that are numerical representations of the semantics of context-specific training data 174. Vector database 176 is populated using document intelligence tools, a transformer, and/or a large language model (LLM) that at least partially analyzes and conditions context-specific training data 174 into a searchable format. AI model 178 may be configured to operate as a transformer for populating vector database 176. Vector database 176 may include a number of fields for the vector index, such as, tokens, emergency type, content, ECC name, operations center name, first responder station. Vector database 176 may include a pre-defined search dimension (e.g., 1536 dimensions) based on the embeddings model used, for example. Additional embodiments related to conditioning data for vector database 176 are described in relation to FIG. 5.

AI model 178 may be implemented using one or more of a variety of technologies. AI model 178 may be a service that emergency response data system 102 communicates with remotely or may include a number of libraries and software packages installed onto one or more local or distributed server (e.g., cloud) systems. AI model 178 may be implemented using transfer learning models that apply knowledge learned from one task to another, typically using pre-trained models. Examples of transfer learning models that may be used include, but are not limited to, BERT (bidirectional encoder representations from transformers): a transformer-based model for natural language processing tasks; GPT (generative pretrained transformer): a generative model for text-based tasks; and ResNet: a pre-trained deep learning model commonly used for image classification. AI model 178 may incorporate other types of models, such as deep learning models, unsupervised models, generative models, recommender systems, or the like. Examples of deep learning models may include convolutional neural networks (CNN), which may be used for image recognition tasks; recurrent neural networks (RNN), which may be used for sequential data, such as time series or natural language; and long short-term memory networks (LSTMN), for example.

AI model 178 may be implemented using one or more large language models (LLMs), according to an embodiment. LLMs are AI models that are trained to understand and generate human language. LLMs use large amounts of text data to learn patterns, context, and meaning in language. Examples of LLMs include, but are not limited to, generative pretrained transformers (GPTs), BERT, DistilBERT, T5 (Text-to-Text Transfer Transformer), XLNet, Turing-NLG, LLaMA (Large Language Model Meta AI), Claude, PaLM (Pathways Language Model), Megatron-Turing NLG, ChatGPT, OpenAI Codex, ERNIE (Enhanced Representation through Knowledge Integration), and/or Grok.

AI model 178 may be configured to aggregate and analyze information to generate insights that are responsive to trigger events 170, according to an embodiment. AI model 178 may be configured to aggregate and analyze characteristics of live call audio 142 by analyzing and/or transcribing and analyzing live call audio 142 that is received, for example, with audio transmitter 141 or 143. AI model 178 may be configured to analyze characteristics of live call audio 142 with data sources 104 and information from trigger events 170 as context for generating emergency response insights 118. AI model 178 may be configured to (or prompts 180 may instruct AI model 178 to) search vector database 176 for context-specific information.

AI model 178 may be configured to operate at different risk tolerance levels or temperatures. For example, under a low temperature setting, AI model 178 may generate conservative results that are more verbatim and grounded in the information loaded into the vector database. Additionally, under a high or higher temperature setting, AI model 178 may generate creative results that may be less verbatim and may be based on information that is external to the information loaded into the vector database, for example.

Prompts 180 may be used to instruct AI model 178 to operate differently for different scenarios. Prompts 180 may be used to provide instructions to AI model 178 to cause AI model 178 to operate as, for example, a dispatcher, an operations center operator, and/or a first responder. Prompts 180 may include instructions related to: organizing key data points about an incident that can be pushed to relevant stakeholders; providing a telecommunicator with information they may not have readily available during an emergency call that may improve the chances of a successful response; pulling up snapshots of relevant information from long and complicated procedural documents used during emergency response; triggering specific warnings for the telecommunicator when the information deviates from the expected; aggregating extracted information and classifying the 911 call as "relevant" or "irrelevant" in order to deprioritize and divert non-emergency or duplicate calls to a non-emergency workflow; and/or preparing the telecommunicator with known information about a caller before the call even begins.

An illustrative example of a prompt to cause AI model 178 to operate as a dispatcher may include instructions similar to:

"You are an AI Assistant whose task is to analyze a 911 call and its associated metadata and assist the 911 dispatcher with their job. In order to ensure we are capturing the 911 caller's spoken word correctly, we have provided you with transcriptions of the same call using two different speech-to-text services. You should read between the lines, use judgement and/or context clues about the scenario (outlined by the transcriptions AND any accompanying data) to make up for any deficiencies in one speech-to-text service's transcription or the other. The way in which you help the 911 dispatcher with their job is by accomplishing 3 distinct tasks:

1) Propose 1-3 of the following:
   pertinent questions that 911 dispatcher could ask the caller to uncover information about the scenario at-hand,
   pertinent snippet of informative advice grounded in guidance within the provided relevant Documentation or Standard Operating Procedures,
   a recitation of any pertinent information in the additional datasets that could've been overlooked.
2) Provide a Boolean classification of whether placeholders (such as '<insert_address_here>') in the scenario template(s) should be updated given information in the latest chunk of the 911 call transcription.
3) List any APIs that will need to be used to curate additional external data necessary for observation in order to give holistic guidance/advice/propose questions about the scenario at-hand (as outlined in the guidelines of (1) above). The complete list of available external data sources is as follows: ['real_time_weather_api', 'weather_timeframe_api']."

The prompt may or may not include additional rules and may be extended with additional prompt language, such as:

Since you are assisting a 911 dispatcher, it is imperative that you know when you should propose questions or supply advice and when you should stay quiet. If the call has not progressed far enough to ascertain clear advice, simply list 1 question. On the other hand, if the call has progressed further and there is detailed guidance in the SOP's, you may provide 3 snippets of advice or guidance.

Ensure that your snippet(s) of guidance or advice (if any) is/are grounded in the provided Documentation or Standard Operating Procedures.

Your questions can be founded in the provided Documentation or Standard Operating Procedures as well."

AI model 178 or other portions of AI assistant system 116 may be at least partially implemented on a computing system that is local to the ECC to reduce latency in data transmission between an ECC and remote data processing servers. For example, AI model 178 and/or RAG system 162 may be implemented using a local LLM, allowing live call audio and historical ECC data to be received from call handling equipment, processed on-premises, and re-inserted into the call handling equipment or to an ECC terminal.

Emergency management applications 124 may provide location data 182 and alert data 184, in addition to emergency response insights 118, according to an embodiment. Location data 182 may include a device-based location of an emergency event. The device-based location may be derived from call data 122 and/or may be received from third-party server 106. The device-based location may be based on GPS location of user device 105 or based on registered locations of electronic devices in the vicinity of user device 105, according to various embodiments. Alert data 184 may include alerts or notifications that are based on sensor data 144 or one or more additional data sources 104, according to an embodiment. Location data 182 and/or alert data 184 may be provided to or displayed by one or more of the emergency management applications 128, 130, and/or 132, according to various embodiments.

Emergency response data system 102 and AI assistant system 116 may be configured to be responsive to queries 172 that may be entered into and received through any one of emergency management applications 128, 130, and/or 132. Emergency response data system 102 and AI assistant system 116 are configured to be responsive to queries 172 in the absence of a call-based trigger and/or a data-based trigger, according to an embodiment. Emergency management applications 128, 130, and/or 132 may include a query input text box, may perform audio to text, or may receive and transmit audio to provide queries 172 to AI assistant system 116. AI assistant system 116 may use queries 172 as a trigger event 170. AI assistant system 116 may convert queries 172 into a semantic vector (e.g., using AI model 178) to perform a vector search of vector database 176, a content search of vector database 176, and/or a hybrid vector-content search of vector database 176. Queries 172 may include queries related to summaries, graphs, charts, or other visualizations of analytics for an ECC, operations center, and/or first responder device/station, according to an embodiment. AI assistant system 116 may provide responses to queries 172 as emergency response insights 118 and using similar UI elements in graphical user interfaces of emergency management applications 128, 130, and/or 132.

Various embodiments of the disclosure reference vector searches. It is to be understood that the disclosed methods and systems may be configured to perform a hybrid search with a text-based search of the emergency response procedure data in addition to the vector search, in accordance with aspects of the disclosure.

FIGS. 2A, 2B, 2C, 2D, 2E, 3A, 3B, and 3C illustrate example user interfaces (UIs), UI elements, and processes that may be used in a variety of implementations to provide real-time AI-based assistance, insights, and analytics to ECCs, operations centers, and/or first responders, in accordance with various embodiments of the disclosure. Any UI element shown in one of FIGS. 2A, 2B, 2C, 2D, 2E, 3A, 3B, and 3C may be applied to one or more other FIGS. 2A, 2B, 2C, 2D, 2E, 3A, 3B, and 3C in the disclosure to make additional embodiments that are contemplated as being within the scope of the present disclosure.

Figure 2A:
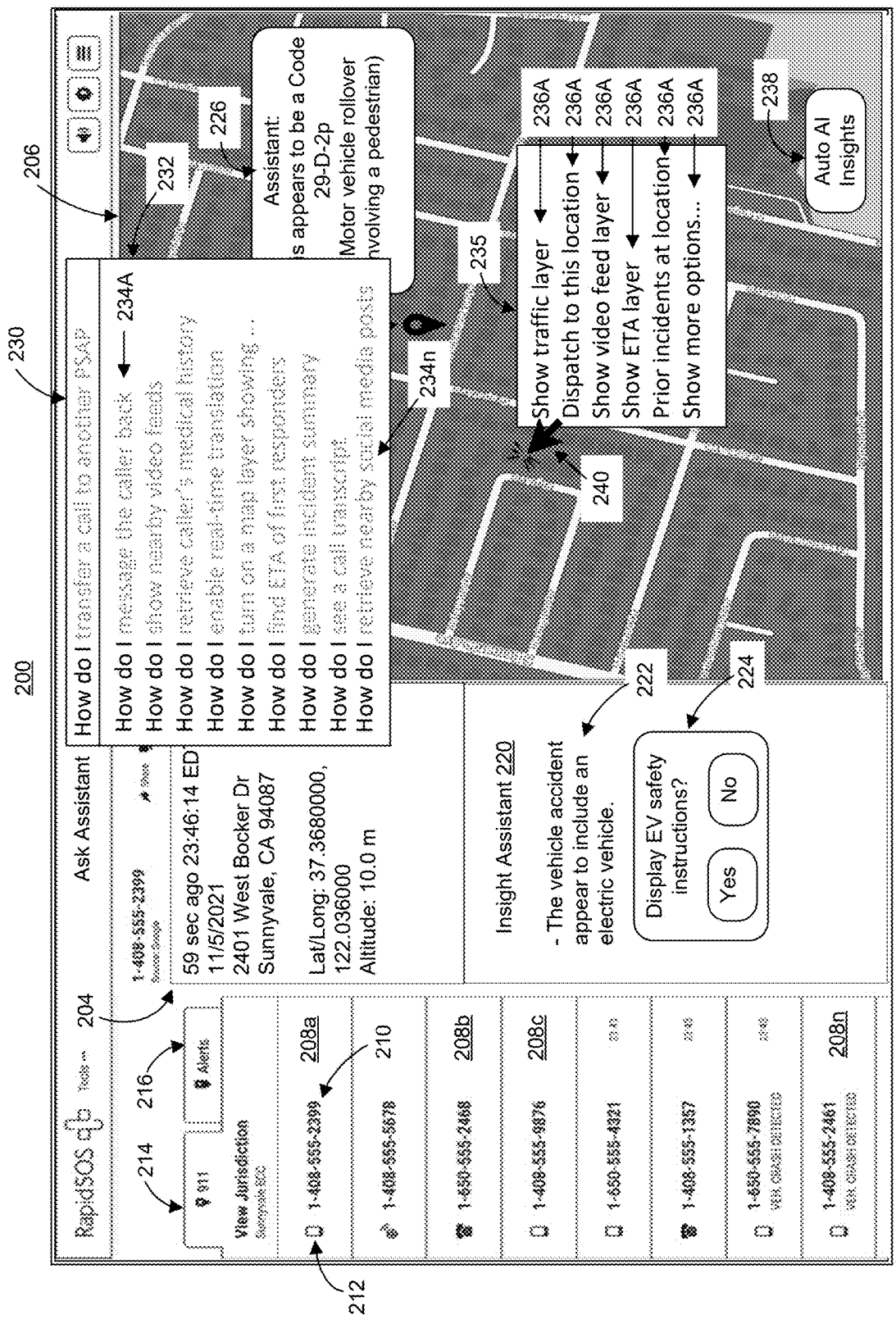
FIGS. 2A, 2B, 2C, and 2D illustrate example diagrams of user interfaces and processes for providing emergency response artificial intelligence (AI) agent insights in an emergency management application, in accordance with aspects of the disclosure.

FIGS. 2A, 2B, 2C, and 2D illustrate example diagrams of agentic AI being applied to UIs and processes for ECC emergency management applications as example implementations of ECC emergency management application 128 that may be operated by an ECC computing system (e.g., ECC computing system 108), in accordance with aspects of the disclosure. FIG. 2A illustrates a diagram of a UI 200 for an ECC emergency management application that displays/includes emergency response insights that may be provided by an AI assistant system (e.g., AI assistant system 116, shown in FIGS. 1A and 1B), according to an embodiment. UI 200 includes an incident queue 202, a data card 204, and a map 206. Incident queue 202 includes a number of individual incidents 208 (individually 208a, 208b, 208c, ... 208n) that are representative of requests for emergency services. Each incident 208 may represent a phone call, a text message (e.g., SMS, MMS, etc.), a video conference request made to, for example, 911 services, etc. Each incident 208 may be associated with a telephone number 210 and may be associated with an icon 212 that describes the source or mode of contact (e.g., cell phone, land line, Internet-based session, etc.). Incident queue 202 may include tabs to separate and organize different types of incidents that are received by an ECC emergency management application and that are displayed by UI 200. For example, a first tab 214 may be used to organize emergency requests that are initiated by user based on a phone call, text message, or a video conference request. A second tab 216 may be used to organize incidents 208 that are initiated based on sensor data (e.g., a smoke alarm, a proximity alarm, a home alarm system, vehicle telematics, etc.). The sensor data may be initially received by emergency response data system 102 (shown in FIG. 1B) and may be provided to an ECC through emergency applications 124 (shown in FIG. 1B), for example.

Data card 204 provides detailed information for a particular or selected incident 208. Data card 204 may include an address, latitude and longitude coordinates, information about a caller, the name and contact information for a point of contact, the type of sensor or alarm that triggered an incident, the name of the sensor manufacturer, etc.

Map 206 may graphically display a location 218 of one or more of the incidents 208 (or senor data alerts) displayed in incident queue 202. Location 218 may be indicated on map 206 with a number of different types of icons. For example, an icon can include a pin drop or can include a graphical representation of the nature of the incident. For example, a fire icon may represent a fire-related incident, a Red Cross symbol may represent a medical-related incident, a vehicle icon may represent a vehicular accident, a camera icon may represent an incident that was identified through video analysis or may represent a remotely accessible video feed, a drone may represent accessible drones, a helicopter may represent an accessible air ambulance, or the like. A dispatcher, telecommunicator, or other operator of an ECC computing system may use UI 200 to dispatch first responders or emergency responders to location 218 of incident 208. UI 200 includes various information that enables and supports an operator to convey helpful information to the first responders and/or to enable dispatch of various resources (e.g., air ambulance, drone support, etc.).

UI 200 displays various examples of agentic AI generated emergency response insights that may be provided to and/or displayed on an ECC emergency management application, in accordance with aspects of the disclosure. The emergency response insights are non-exhaustive and illustrative example implementations of emergency response insights 118 (shown in FIG. 1B). For example, UI 200 may include an insight assistant window 220, and insight assistant window 220 may provide a notification 222 that a vehicle accident may include an electric vehicle. The AI assistant system may extract the emergency response insight of notification 222 from telematics data (e.g., identifying an electric vehicle and crash) received from one or more data sources and may correlate the location of the telematics data with the location of an incident to generate notification 222. Insight assistant window 220 may provide a prompt 224 to suggest an action, such as to display electric vehicle safety instructions that the AI assistant system may extract using the RAG system (e.g., RAG system 162 shown in FIG. 1B) and/or using an AI agent (e.g., AI agent 402 shown in FIG. 4A).

UI 200 displays a suggestion 226, as an example of an AI generated emergency response insight. Suggestion 226 suggests a particular dispatch code (e.g., code 29-D-2p) that is used to characterize a particular (e.g., a selected) incident. The dispatch code may be identified as a result of a prompt to an AI agent (e.g., "suggest a dispatch code to display, when relevant") or of a vector search or hybrid content-vector search of a database that is trained on emergency response procedure data, according to an embodiment.

UI 200 includes a query text box 230 powered (generated) by an AI assistant system that is trained on emergency response data and that has access to stored UI data (e.g., ECC search history, prior actions taken, dispatch requests, etc.), according to an embodiment. AI assistant system may include one or more AI agents (e.g., implemented in AI agent logic) that enable the emergency management application to auto-complete queries based on a history of emergency response data (e.g., from data sources 104), a history of queries, a history of queries at nearby ECCs, a history of queries of statewide or country-wide ECCs, and/or a history of UI actions taken/requested (e.g., showing different map layers, clicking on particular icons, requesting particular resources, etc.), for example. The one or more AI agents operations may be influenced, weighted, or otherwise informed by a motivation module and/or one or more prompts/instructions. The motivation module and/or the one or more prompts/instructions may cause the one or more AI agents to suggest the most likely query or action request (e.g., show traffic layer) a dispatcher is likely to choose based on historical data as well as based on current emergency response data (e.g., 911 call audio, sensor data, traffic data, etc.), for example. The one or more AI agents may be configured to populate a dropdown menu 232 with auto-completed query suggestions 234 (e.g., individually, query suggestions 234A through 234n) that are generated based on historical data combined with current emergency response data, according to an embodiment. A user (e.g., telecommunicator, dispatcher, ECC director, statewide director, etc.) may select the auto-completed query suggestion 234 that most closely suits the intended search. Query suggestions 234 may be represented in dark (e.g., black) text font for portions of the query that are entered by a user and may be grayscale or a lighter text font for the AI-generated suggestion portion of each query, for example.

Query text box 230 may be used for any query related to an ECC, in accordance with aspects of the disclosure. That is, the AI agents may at least partially rely on data from the ECC and currently received emergency response data to formulate or generate various types of AI content. The AI agents may be configured to perform external Internet searches to determine various options for responding to a query and may generate responses (e.g., charts, graphs, questions, insights) accordingly. As an example, and as described in FIGS. 3A, 3B, 3C, 3D, and 3F, query text box 230 may be used to leverage AI agents to generate various context-based analytics report and supporting features.

UI 200 may selectively display AI-driven action suggestions 235 options 236 (e.g., individually, options 236A, 236B, 236C, 236D, 236E, and 236F) to reduce latency in dispatching emergency resources and to facilitate providing life-saving emergency-related details (e.g., location, traffic congestion, information from video feeds, etc.) to first responders, according to an embodiment. In response to moving or clicking a cursor 240 (e.g., a mouse), in combination with current emergency response data (e.g., receiving a 911 call, receiving a car crash telematics alert, receiving a smoke/fire alarm notification, etc.), and historical ECC and/or UI interactions data, AI agents may be configured to provide suggested actions to select from. In the illustrated example, cursor 240 is clicked in map 206 and emergency management application displays action suggestions 235 with: option 236A to "show traffic layer", option 236B to "dispatch to this location", option 236C to "show video feed layer", option 236D to "show ETA layer", option 236E to show "prior incidents at location", and option 236F to "show more options . . . ". These are illustrative examples of action suggestions that one or more AI agents may suggest and that emergency management application may display through UI 200, in accordance with embodiments of the disclosure.

An emergency management application may use UI 200 to automatically display AI insights (e.g., as pop-up windows like suggestion 226), in accordance with aspects of the disclosure. UI 200 may include auto AI insights button 238 positioned somewhere within UI 200 (e.g., in the bottom right-hand corner of map 206) to facilitate user selection. In one embodiment, auto AI insights button is a floating action button (FAB) that floats over UI 200 with dynamic locations that do not impede normal use of UI 200. Upon persistent selection (e.g., toggle button) or single-click selection of auto AI insights button 238, emergency response application may prompt or instruct one or more AI agents to automatically surface key insights, anomalies, or trends. The insights, anomalies, or trends may be based on a combination of one or more of historical ECC data, historical first responder data, historical operations center data, historical emergency response data (e.g., data sources 104), external sources of data (e.g., weather feeds, social media feeds, traffic feeds, news feeds, public information databases, etc.), standard operating procedures, employee training manuals, current emergency response data (e.g., video feeds, telematics data, smart building sensor data), first responder locations, and/or historical trends/analytics. The insights, anomalies, or trends may include, but are not limited to, a potential active shooter alert, re-routing instructions for first responders due to traffic, 911 system outage, and/or likelihood of future/predictive emergency calls (e.g., car accidents, domestic violence calls, holiday, particular intersections, flood rescue calls, etc.) based on time, calendar day, weather, natural disaster, and/or any of the aforementioned sources of data, according to embodiments of the disclosure.

Figure 2B:
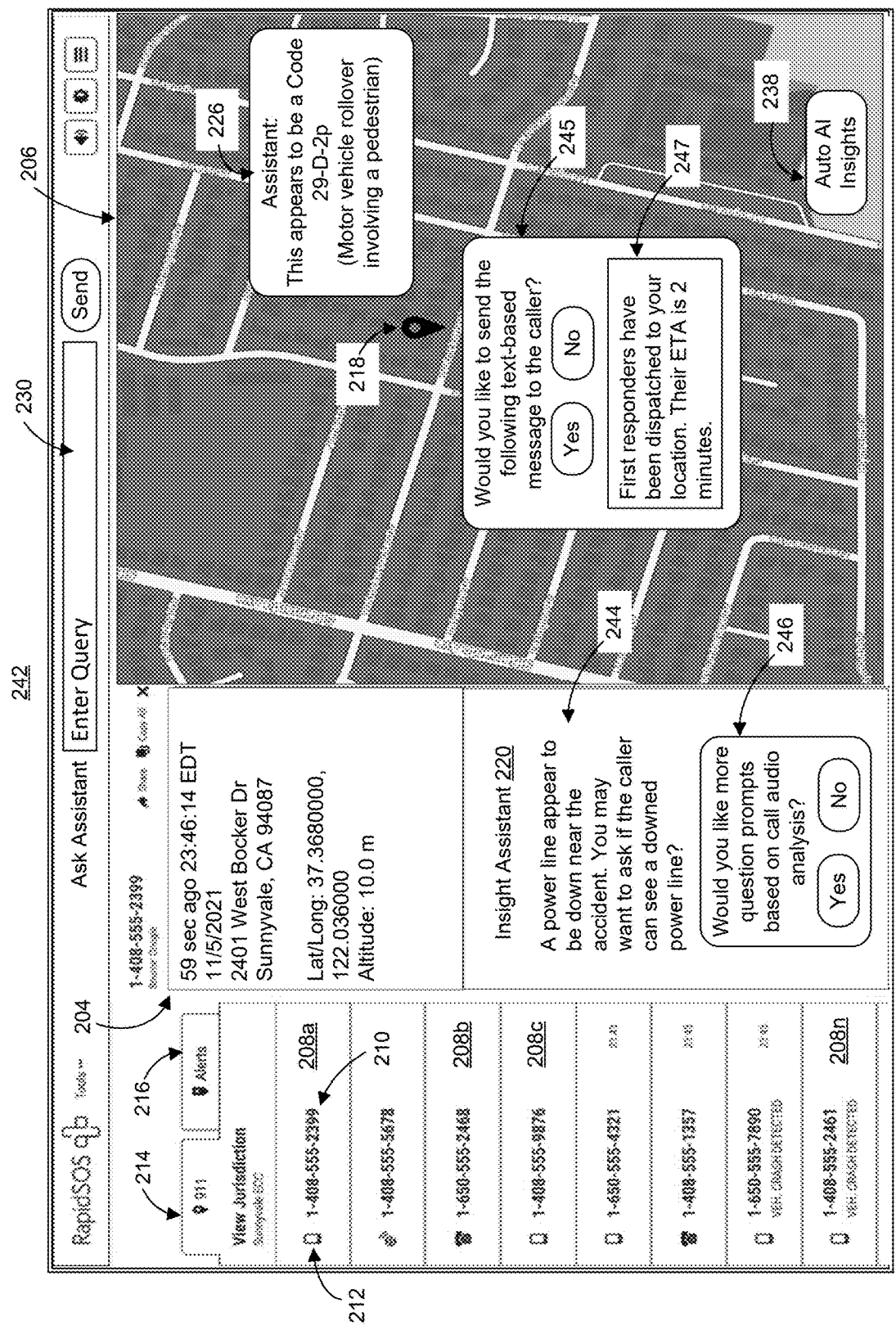

FIG. 2B illustrates an example diagram of the emergency management application using a UI 242 to display an example of an insight, anomaly, or trend that may be surfaced as part of a suite of AI-based features available through the emergency management application utilizing one or more AI agents, according to an embodiment. For example, in response to one or more AI agents detecting a potentially downed powerline, emergency management application by cause UI 242 to use insight assistant window 220 to display a message 244 that recites, "A power line appears to be down near the accident. You may want to ask if the caller can see a downed power line." Message 244 includes a notification and suggested question that may be based on AI agent analysis of power company services updates available on power company servers, based on video analysis of video feeds available in proximity to the location of the accident, and/or based on analysis of 911 call audio or text messages to 911, for example. The emergency management application may use UI 242 to display a (pop-up) menu 246 to enable a user to elect to receive, for example, additional question prompts based on live call audio or other data sources.

The emergency management application is operable to suggest, display, and transmit AI-generated messages for a 911 caller (or 911 text message sender), in accordance with aspects of the disclosure. UI 242 may be configured to display a message box 245 that prompts the user (e.g., a telecommunicator) as to whether the user would like to send an AI-generated message 247 to a 911 caller or 911 texter. AI-generated message 247 may be generated by one or more AI agents that analyze call audio data, external data sources, and/or historical emergency response/management data for a particular ECC and/or for a particular region around the location of the initiated 911 communications. The one or more AI agents may be configured with a role of emergency data analyst and may be prompted to suggest text-based correspondence for a 911 caller or texter that may be sent (e.g., from the emergency management application) in parallel with or after a telecommunicator speaks with the caller.

Figure 2C:
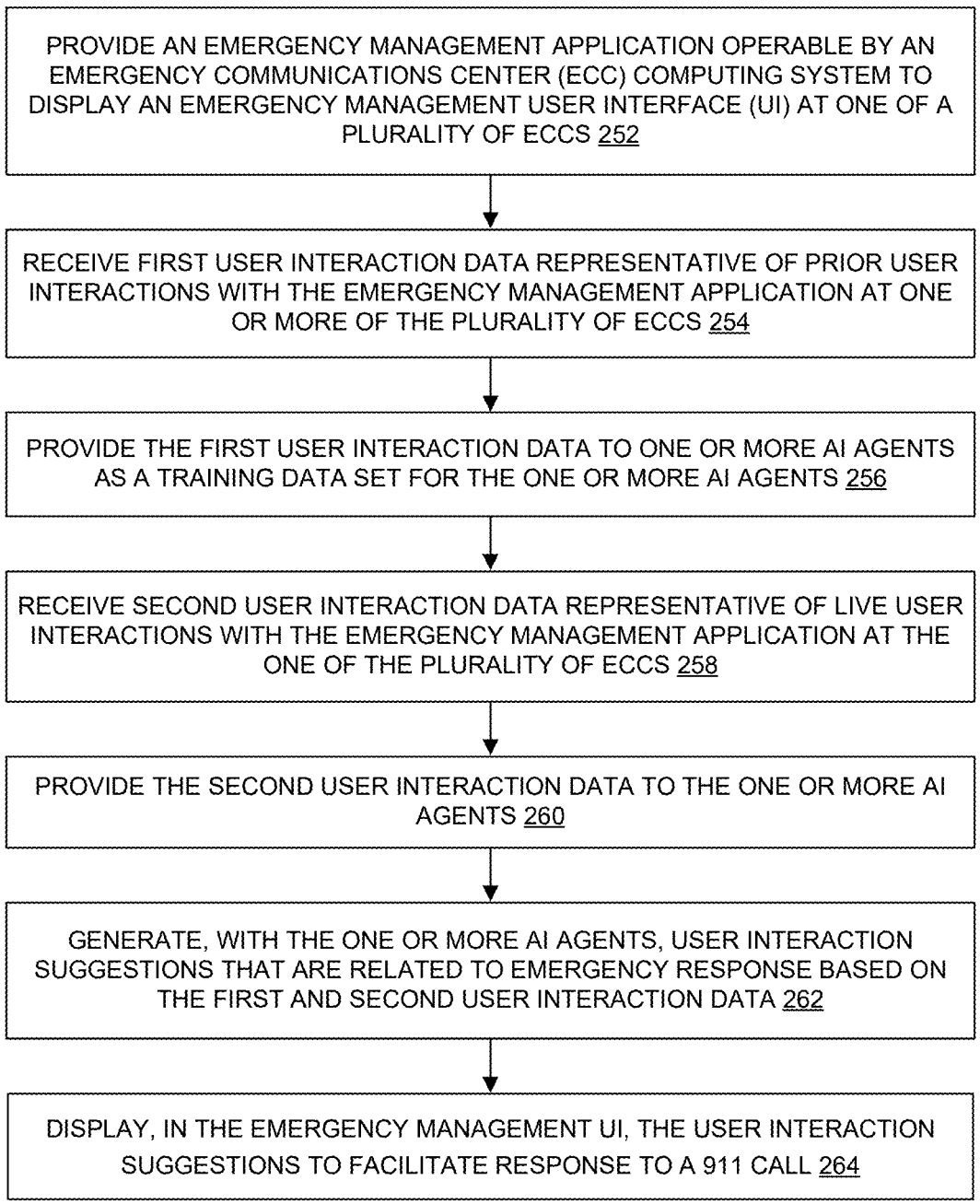

FIG. 2C illustrates a flow diagram of a process 250 for providing emergency response AI agent insights, in accordance with aspects of the disclosure. Process 250 may be implemented by one or more aspects of the emergency response data system. Process 250 includes a number of operations; it is to be understood that one or more of the operations may be performed out of the described order and/or in parallel with other operations.

At operation 252, process 250 provides an emergency management application operable by an emergency communications center (ECC) computing system to display an emergency management user interface (UI) at one of a plurality of ECCs, according to an embodiment.

At operation 254, process 250 receives first user interaction data representative of prior user interactions with the emergency management application at one or more of the plurality of ECCs, according to an embodiment. This historical data captures how ECC personnel have previously used the application in various emergency scenarios. Analyzing these past interactions can reveal patterns and best practices in system usage.

At operation 256, process 250 provides the first user interaction data to one or more AI agents as a training data set for the one or more AI agents, according to an embodiment. By learning from this historical data, the AI agents can develop an understanding of effective user workflows and common actions taken during emergencies. This training enables the AI to provide contextually relevant suggestions in the future.

At operation 258, process 250 receives second user interaction data representative of live user interactions with the emergency management application at the one of the plurality of ECCs, according to an embodiment. This real-time data reflects the current actions and inputs of the ECC personnel as they respond to an active 911 call. Monitoring these live interactions allows the system to understand the immediate context of the situation.

At operation 260, process 250 provides the second user interaction data to the one or more AI agents, according to an embodiment. By receiving this up-to-the-minute information, the AI agents can consider the specific actions being taken by the user in the current emergency.

At operation 262, process 250 generates, with the one or more AI agents, user interaction suggestions that are related to emergency response based on the first and second user interaction data, according to an embodiment. Leveraging both historical patterns and live actions, the AI agents can anticipate the user's (e.g., telecommunicator) potential next steps and offer helpful suggestions. These suggestions aim to improve efficiency and accuracy during critical moments.

At operation 264, process 250 displays, in the emergency management UI, the user interaction suggestions to facilitate response to a 911 call, according to an embodiment. Presenting these suggestions directly within the interface allows ECC personnel to quickly consider and access AI-driven guidance. This can lead to faster and more effective responses to emergency situations.

Figure 2D:
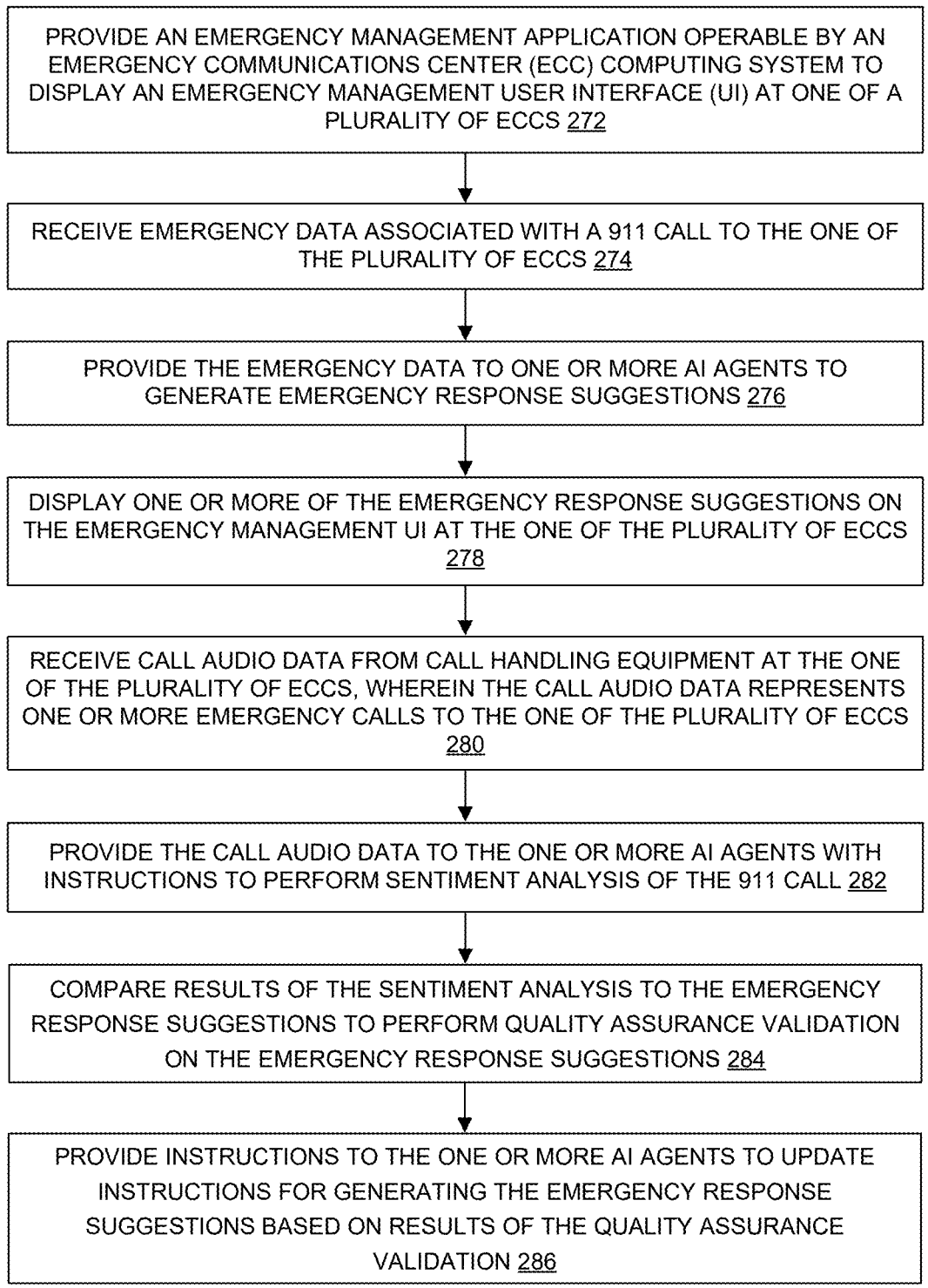

FIG. 2D illustrates a flow diagram of a process 270 for providing emergency response AI agent insights, in accordance with aspects of the disclosure. Process 270 may be implemented by one or more aspects of the emergency response data system. Process 270 includes a number of operations; it is to be understood that one or more of the operations may be performed out of the described order and/or in parallel with other operations.

At operation 272, process 270 provides an emergency management application operable by an emergency communications center (ECC) computing system to display an emergency response management user interface (UI) at one of a plurality of ECCs, according to an embodiment. This allows personnel at different emergency response locations to access and utilize the same application. The emergency management UI can present critical information and tools that support managing emergency situations effectively.

At operation 274, process 270 receives emergency data associated with a 911 call to the one of the plurality of ECCs, according to an embodiment. This emergency data can include information such as a caller's location, phone number, and the nature of the emergency as initially reported.

At operation 276, process 270 provides the emergency data to one or more AI agents to generate emergency response suggestions, according to an embodiment. These AI agents can analyze the incoming data using various algorithms and models to identify potential courses of action. The suggestions aim to assist ECC personnel in making informed and timely decisions.

At operation 278, process 270 displays one or more of the emergency response suggestions on the emergency response management UI at the one of the plurality of ECCs, according to an embodiment. By presenting these suggestions directly within the user interface, ECC personnel can quickly review and consider different response options—streamlining the decision-making process during critical events.

At operation 280, process 270 receives call audio data from call handling equipment at the one of the plurality of ECCs, wherein the call audio data represents one or more emergency calls to the one of the plurality of ECCs, according to an embodiment. This audio data provides a real-time record of the communication between the caller and the ECC personnel. Access to this audio can be valuable for understanding the nuances of the situation.

At operation 282, process 270 provides the call audio data to the one or more AI agents with instructions to perform sentiment analysis of the 911 call, according to an embodiment. The AI agents may be instructed/configured to analyze the tone and emotional content of the audio to gauge the caller's emotional state and the urgency of the situation. This analysis can provide additional context beyond the initial emergency data.

At operation 284, process 270 compares results of the sentiment analysis to the emergency response suggestions to perform quality assurance validation on the emergency response suggestions, according to an embodiment. This comparison helps to ensure that the AI-generated suggestions are aligned with the perceived emotional context of the emergency. Discrepancies might indicate a need to refine the suggestions.

At operation 286, process 270 provides instructions to the one or more AI agents to update instructions for generating the emergency response suggestions based on results of the quality assurance validation, according to an embodiment. This feedback loop allows the AI agents to learn and adapt their suggestion generation process over time. By incorporating the insights from the quality assurance, the system can continuously improve the relevance and effectiveness of its recommendations.

In summary, the process 270 detailed in FIG. 2D outlines a system for providing AI-driven insights to emergency response personnel. This involves presenting a user interface, receiving initial emergency data, generating response suggestions using AI agents, and displaying these suggestions to the user. Furthermore, the process incorporates call audio analysis for sentiment, which is then used to validate and refine the AI agents' future suggestions, thereby creating a continuous learning loop to enhance the quality and relevance of emergency response guidance.

Figure 3A:
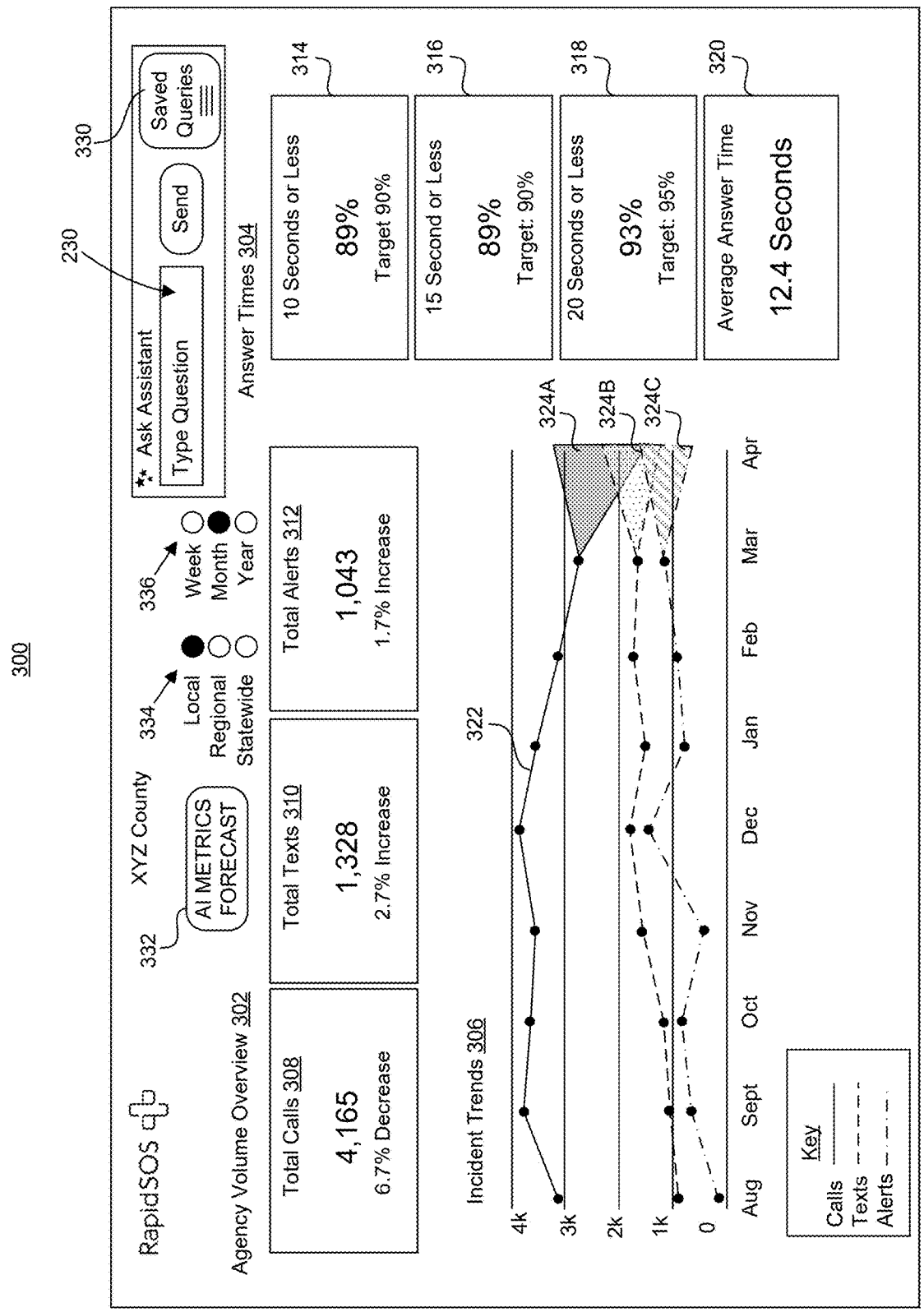
FIGS. 3A, 3B, 3C, 3D, 3E, and 3F illustrate example diagrams of user interfaces and processes for providing agentic AI emergency response analytics in an emergency management application, in accordance with embodiments of the disclosure.

FIGS. 3A, 3B, 3C, 3D, 3E, and 3F illustrate example diagrams of applying agentic AI to emergency management UIs and processes for providing analytics to ECCs in an emergency management application, in accordance with aspects of the disclosure. The emergency management application is an example implementation of ECC emergency management application 128, which may be operated by an ECC computing system (e.g., ECC computing system 108), in accordance with aspects of the disclosure. The emergency management UIs may provide various types of visualizations of emergency response analytics using, for example, at least one of line graphs, bar graphs, pie charts, scatter plots, histograms, area charts, heat maps, geographic charts, data tables, pivot tables, statistics windows, key performance indicators (KPI) dashboards, and/or real-time counters. FIG. 3A illustrates a UI 300 of an emergency management application that displays various analytics (e.g., ECC analytics) that may be used by ECC personnel to evaluate and improve responsiveness and training for emergency response handling (e.g., answering 911 calls, dispatching first responders, requesting relevant information during emergency communications, etc.), in accordance with aspects of the disclosure.

UI 300 illustrates a diagram of example features related to determining and providing (e.g., displaying) ECC-related analytics in an emergency management application, in accordance with aspects of the disclosure. UI 300 includes an agency volume overview 302, answer times 304, and incident trends 306 as example analytics, according to an embodiment.

Agency volume overview 302 is a region within UI 300 that may include data window 308, data window 310, and data window 312. Data windows 308, 310, and 312 may correspond to total call statistics, total text statistics, and total alert statistics, respectively. The call, text, and alert statistics may be displayed for a day, month, year, or other period of time. The call, text, and alert statistics may also include total number counts, averages, relative increases/decreases, and the like.

Answer times 304 is a region within UI 300 that may include a data window 314, a data window 316, a data window 318, and a data window 320. Data windows 314, 316, 318, and 320 may be configured to provide various statistics related to answering emergency communications (e.g., 911 calls, text messages to 911, etc.). Data windows 314, 316, 318, and 320 may correspond to calls answered within 10 seconds, calls answered within 15 seconds, calls answered within 20 seconds, and average call answer time (e.g., 12.4 seconds), respectively. Data windows 314, 316, 318, and 320 may provide percentages, counts, ratios, target statistics, averages, and/or one or more additional statistics.

Incident trends 306 is a region within UI 300 that may include a graph, chart or other visual representation of call center (e.g., ECC) statistics. The visual representation may include one or more graph lines 322 that represent call, texts, and/or alert statistics. The visual representation may provide statistics of call center communications (e.g., count, average, percentage, etc.) with respect to time (e.g., days, months, years, etc.). In one embodiment, incident trends 306 includes forecast regions 324 (individually, forecast region 324A, 324B, and 324C) that represent a range of potential upcoming statistics.

Emergency response application may use UI 300 to provide search, forecast, and filter options for AI-based queries and reporting, according to an embodiment. These options may include a saved queries menu 330, an AI forecast selector 332, and geographic filters 334, for example. Leveraging AI agents for analytics queries and reporting enables in-depth and custom analyses that were not previously achievable.

Saved queries menu 330 provides access to saved queries that were entered into query text box 230 to engage with the AI assistant system, according to an embodiment. The AI assistant system enables users to generate complex, multi-step queries from a simple user prompt, in an embodiment. The AI assistant system uses one or more AI agents to communicate back and forth with a user to formulate multi-step queries, which the emergency management application saves as reusable components for subsequent and convenient access. The AI assistant system uses context (e.g., a specific telecommunicator, a particular ECC, a region of ECCs, etc.) from prior interactions that have been stored for analysis, training, and efficient recall. A particular user's content (e.g., queries from a particular telecommunicator) may be used to suggest pre-configured, AI-generated queries that evolve over time. Selection of saved queries menu 330 may display saved queries and/or AI-generated queries (e.g., shown in FIG. 3B), according to embodiments. An example of a multi-step query that may be saved as a custom query is displayed in conversational UI 352 (shown in FIG. 3C).

AI forecast selector 332 may be user operable to provide forecast generation instructions to the AI assistant system, according to an embodiment. An example prompt or instructions to an AI agent of the AI assistant system may include, "Operate as a data analyst. Based on historical trends for calls, text messages, and alerts at this ECC; based on available data sources; considering holidays; considering traffic patterns; considering weather conditions; and considering current events, forecast the likely trend of calls, texts, and alerts statistics for the next 7 days. Update and display the incident trends graph to represent the forecast using a graph or chart that best suits the data." Accordingly, AI forecast selector 332 may be configured to enable users to direct the AI assistant system to generate and visualize predictions about future communication traffic based on a variety of influencing factors. Part of the forecast results may be visualized in the forecast regions 324 as line, bar, or other graphical visualization. The forecasted results may include raw projections with confidence intervals, seasonal adjustments, and/or potentially recommended actions or alerts.

Emergency management application may be configured to generate and visualize analytics at least partially based on geographic filters 334 and temporal filters 336, according to an embodiment. Geographic filters 334 may enable a user to customize analytics requests according to local, regional, or statewide regions. The AI assistant system (e.g., an AI agent) is operable to generate analytics and may use historical data based on the geographic filters (and/or temporal filters) to provide geographically particular results, according to an embodiment. Temporal filters 336 can enable users to specify timeframes for analytics reporting and/or forecasting. The timeframes may include, but are not limited to, an hour, hours, a day, days, a week, weeks, a month, months, semi-annual, annual, and/or years. By combining geographic filter 334 and temporal filter 336, users can gain highly specific insights into emergency events within defined locations and time periods.

Figure 3B:
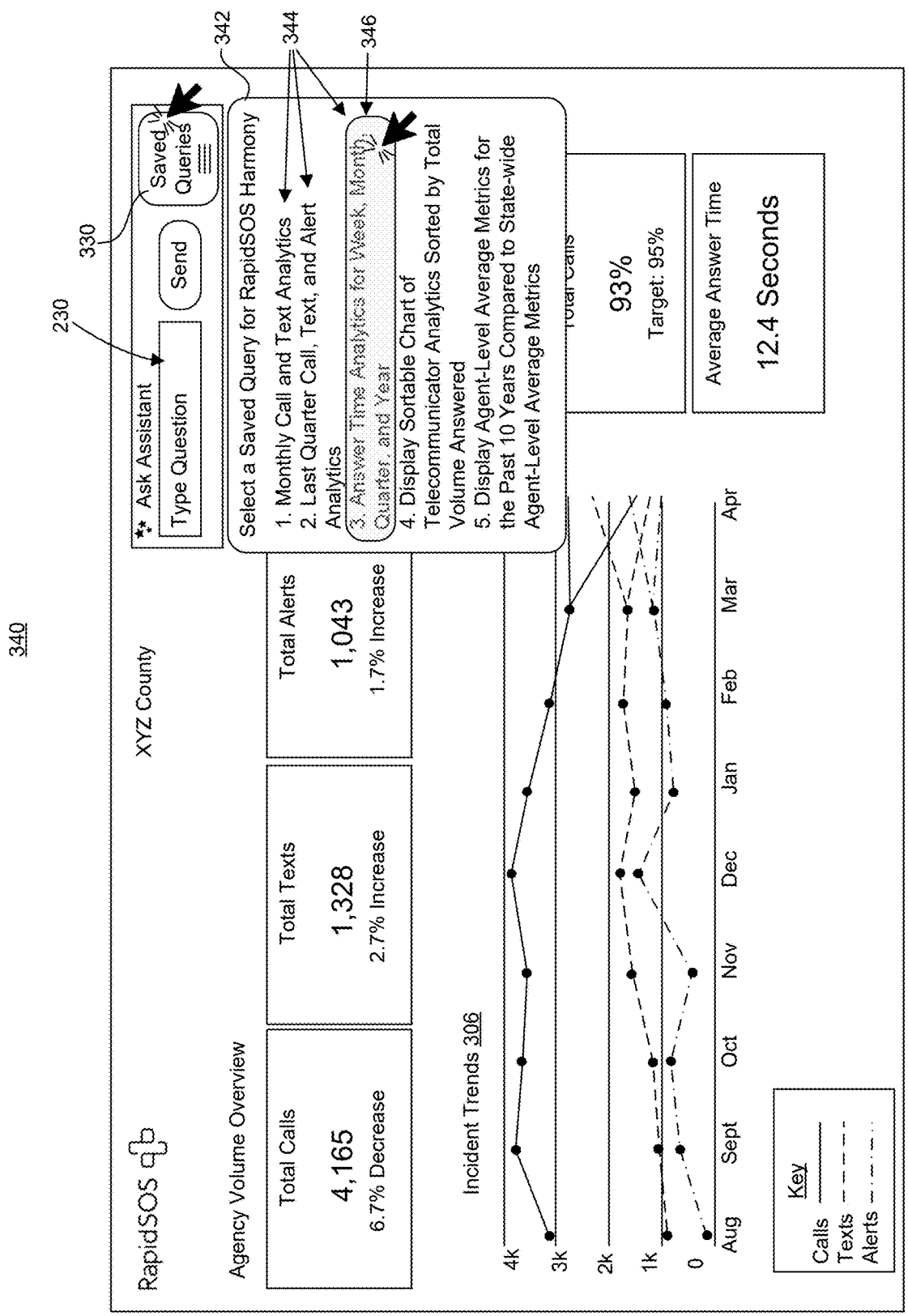

FIG. 3B illustrates a UI 340 of an emergency management application that displays an example of a saved query interface 342 for recalling and displaying saved queries 344, in accordance with aspects of the disclosure. Saved query interface 342 includes a number of saved queries 344 that may be displayed in response to selection of saved queries menu 330, according to an embodiment. In response to selecting a selected saved query 346, the emergency management application provides instructions to the AI assistant system to perform one or more queries associated with selected saved query 346. The AI assistant system returns the query results to the emergency management application for text-based or visual display. The query results of the selected saved query 346 (or other queries submitted to the AI assistant system) may include historical data analysis, may include or reference computer-aided dispatch (CAD) and/or other data sources, and/or may provide human-readable explanations that are responsive to the query.

Figure 3C:
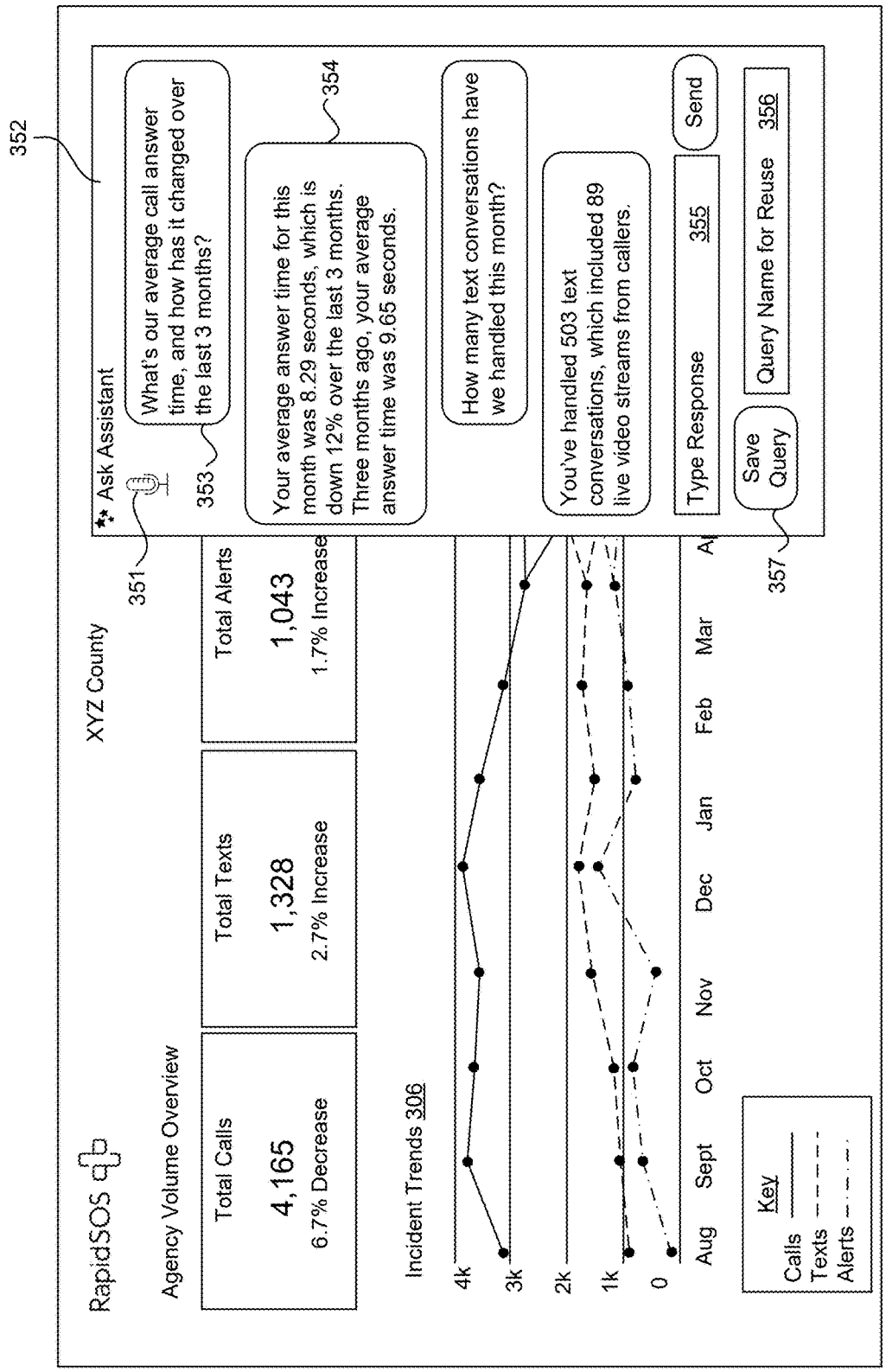

FIG. 3C illustrates a UI 350 of an emergency management application that displays an example of a conversational UI 352 for providing information 353 to the AI assistant system and receiving information from the AI assistant system, in accordance with aspects of the disclosure. A user may type information into conversational UI 352 and/or may select verbal button 351 to verbally communicate with the AI assistant system. In one embodiment, verbal button 351 enables a user to speak information 353 and provides instructions to the AI assistant system to audibly (e.g., through a speaker) and visually provide information 354, in response. Information 353 may include contextual information and/or queries for analysis by the AI assistant system. Information 354 may include follow-up queries, contextual information, and/or responses generated by the AI assistant system, in accordance with aspects of the disclosure. Information 354 may also include human-readable explanations of AI-detected emergency call anomalies, analytics anomalies or patterns as they occur and/or in response to one or more queries. Information 354 received from the AI assistant system may also include suggestion for follow-up questions or visualizations that are likely to be relevant to the user or that are likely to assist the user in refining the submitted or intended query. Additional information may be provided to the AI assistant system in message box 355, the query may be named using text box 356, and a query (e.g., multi-step, conversational, simple, etc.) may be saved with a save query button 357, for example.

Figure 3D:
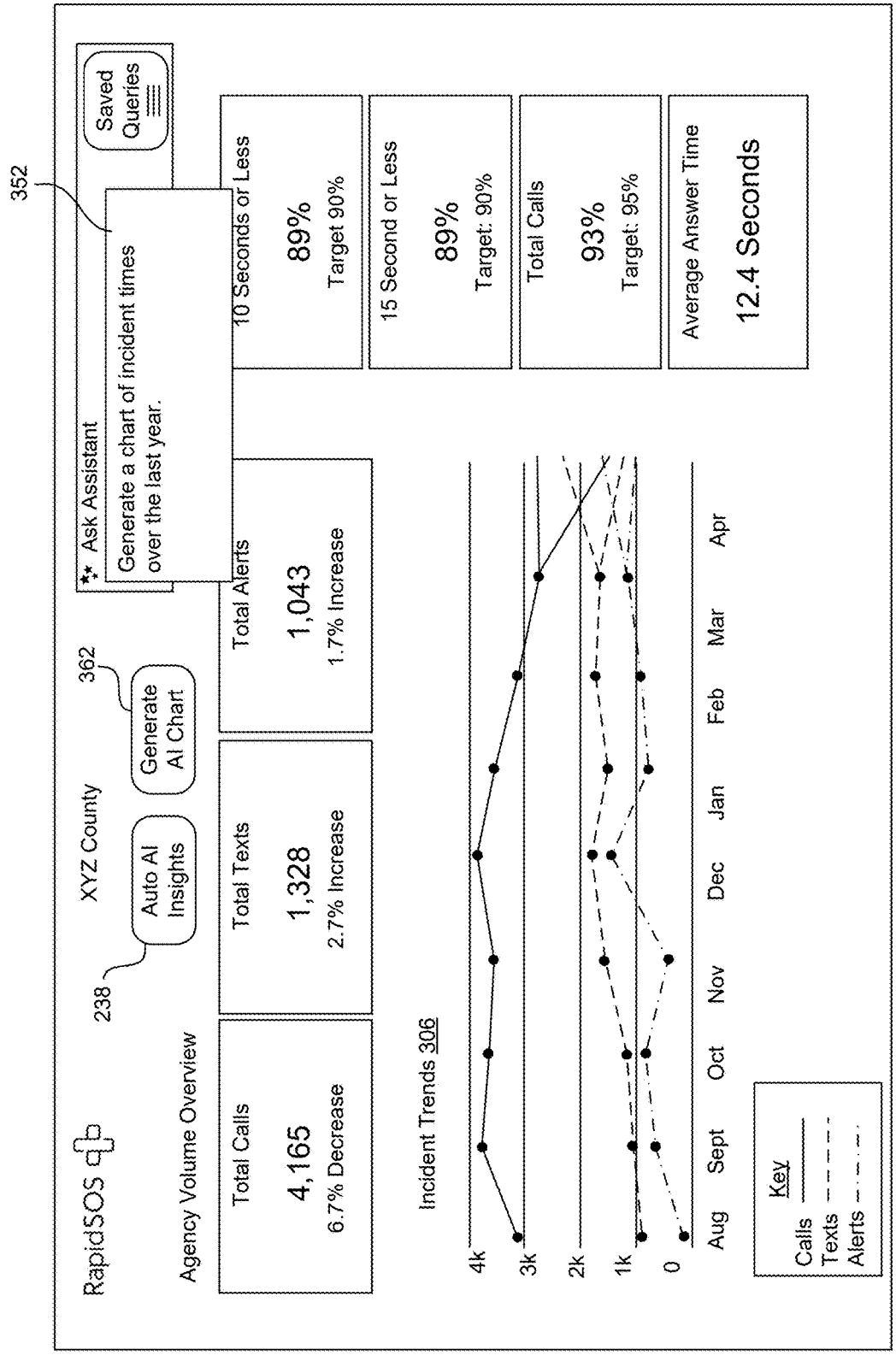

FIG. 3D illustrates a UI 360 of an emergency management application that displays auto AI insights button 238, conversational UI 352, and an example of a generate AI chart button 362, in accordance with aspects of the disclosure. Selection of auto AI insights button 238 may be used to cause emergency management application to provide instructions to the AI assistant system to generate or provide notifications or messages related to detected anomalies or patterns in analytics data. Conversational UI 352 may be used to cause emergency management application to provide instructions to the AI assistant system that are representative of context and or queries submitted by a user. Conversational UI 352 may then be used by emergency management application to provide responsive information from the AI assistant system back to the user, according to embodiments of the disclosure. An example of a query or instruction for the conversational UI 352 is, "Show me sales growth from last quarter in the Northeast." Another example of a query or instruction that may be provided to the AI assistant with conversational UI 352 may include, "generate an FCC report for our ECC in a format that satisfies FCC reporting requirements." Another example of a query or instruction that may be provided to the AI assistant system with conversational UI 352 may include, "give me a report for city council on ECC performance this past month." An example response from the AI assistant system displayed in conversational UI 352 may include, "on Wednesday and Thursday we missed 911 answer times because of a snowstorm that led to challenging travel conditions and a 45% increase in 911 traffic above baseline."

Selection of generate AI chart button 362 may cause the emergency management application to provide instructions to the AI assistant system to provide single-click generation of visualizations based on natural language instructions and underlying data context. UI 360 may enable a user to select a dataset or timeframe, and the AI assistant system may be instructed to autonomously determine and generate the suitable chart type, axes, and filters for representing analytics data relevant to a particular user (e.g., telecommunicator, ECC director, regional ECC director, statewide ECC director, etc.).

Figure 3E:
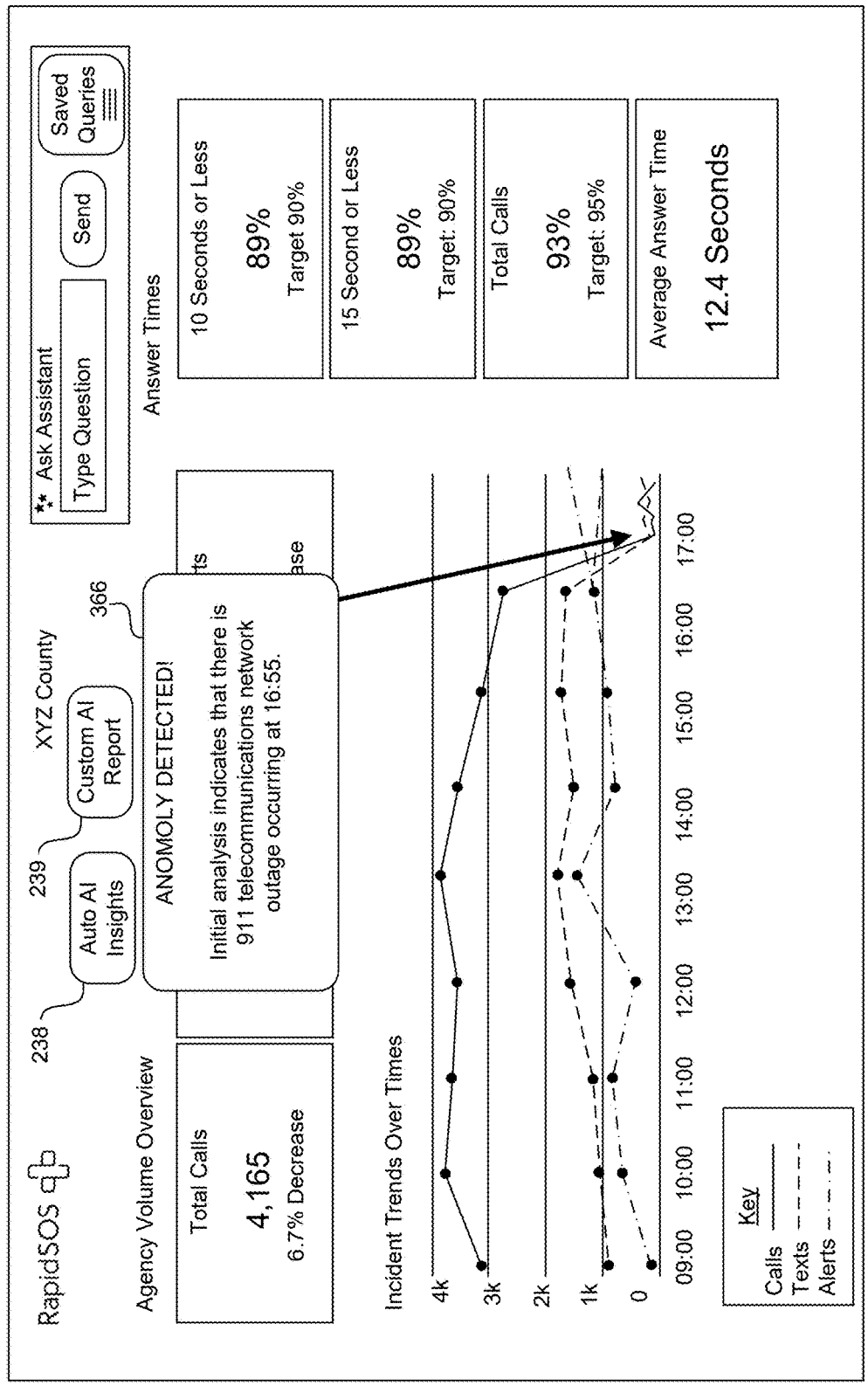

FIG. 3E illustrates a UI 365 of an emergency management application that displays a notification message 366 in response to enablement or selection of auto AI insights button 238, in accordance with aspects of the disclosure. As an example of an anomalous notification that the AI assistant may detect, generate, and provide to the emergency management application, notification message 366 includes "Initial analysis indicates that there is 911 telecommunications network outage occurring at 16:55."

UI 365 also includes a custom AI report button 239, in accordance with aspects of the disclosure. Custom AI report button 239 is configured to generate a report that is compliant with at least one of a city council, a state agency, a federal agency, and/or a federal communications commission (FCC), according to an embodiment of the disclosure.

Figure 3F:
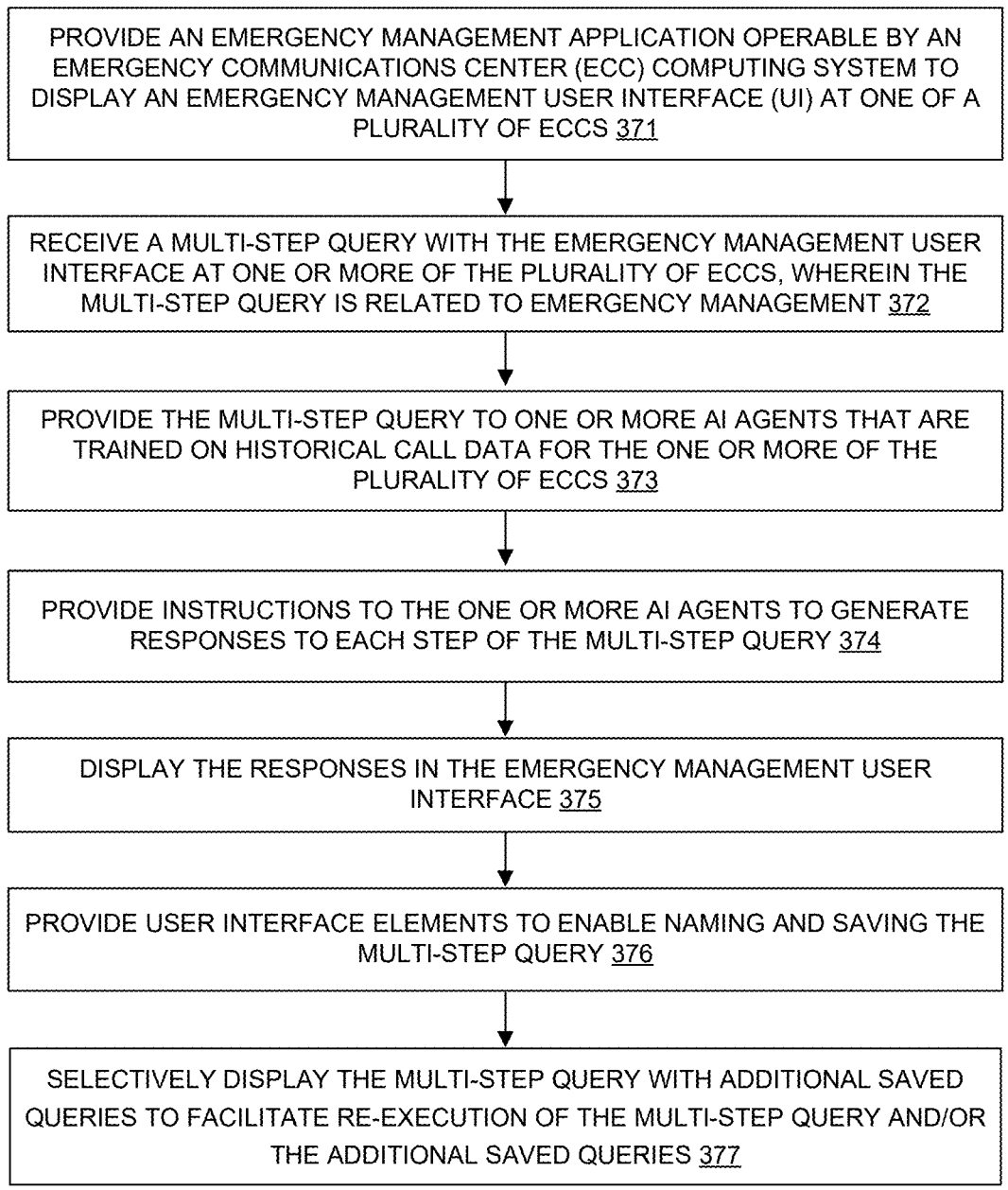

FIG. 3F illustrates a diagram of a process 370 for providing persistent AI queries in emergency management applications, in accordance with aspects of the disclosure. Process 370 may be implemented by one or more aspects of the emergency response data system. Process 370 includes a number of operations; it is to be understood that one or more of the operations may be performed out of the described order and/or in parallel with other operations.

At operation 371, process 370 provides an emergency management application operable by an emergency communications center (ECC) computing system to display an emergency management user interface (UI) at one of a plurality of ECCs, according to an embodiment of the disclosure.

At operation 372, process 370 receives a multi-step query with the emergency management user interface at one or more of the plurality of ECCs, and the multi-step query is related to emergency management, according to an embodiment of the disclosure.

At operation 373, process 370 provides the multi-step query to one or more AI agents that are trained on historical call data for the one or more of the plurality of ECCs, according to an embodiment of the disclosure.

At operation 374, process 370 provides instructions to the one or more AI agents to generate responses to each step of the multi-step query, according to an embodiment of the disclosure.

At operation 375, process 370 displays the responses in the emergency management user interface, according to an embodiment of the disclosure.

At operation 376, process 370 provides user interface elements to enable naming and saving the multi-step query, according to an embodiment of the disclosure.

At operation 377, process 370 selectively displays the multi-step query with additional saved queries to facilitate re-execution of the multi-step query and/or the additional saved queries, according to an embodiment of the disclosure.

Figure 4A:
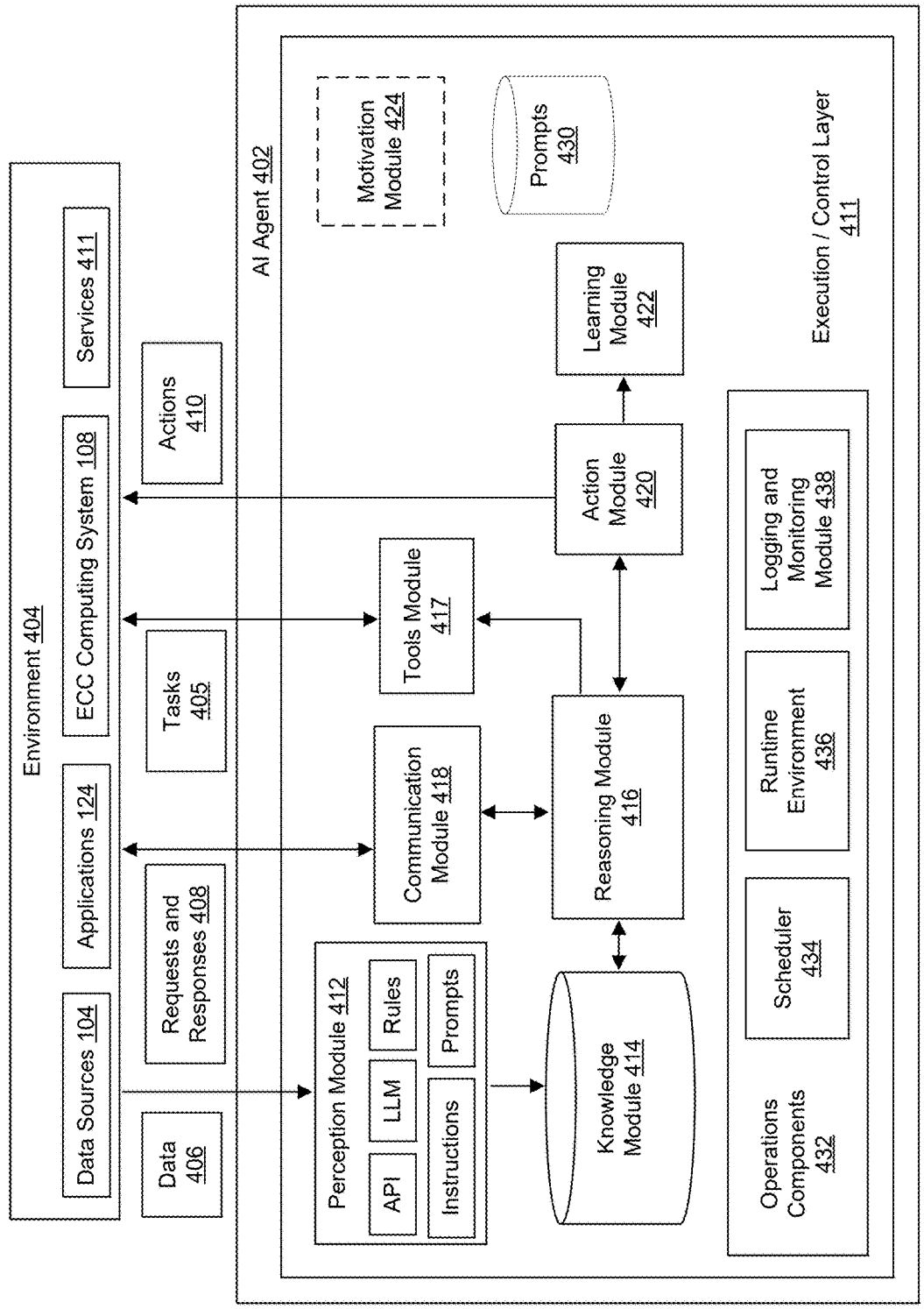
FIGS. 4A, 4B, and 4C illustrate example diagrams of agentic AI architectures for emergency response, in accordance with embodiments of the disclosure.
Figure 4B:
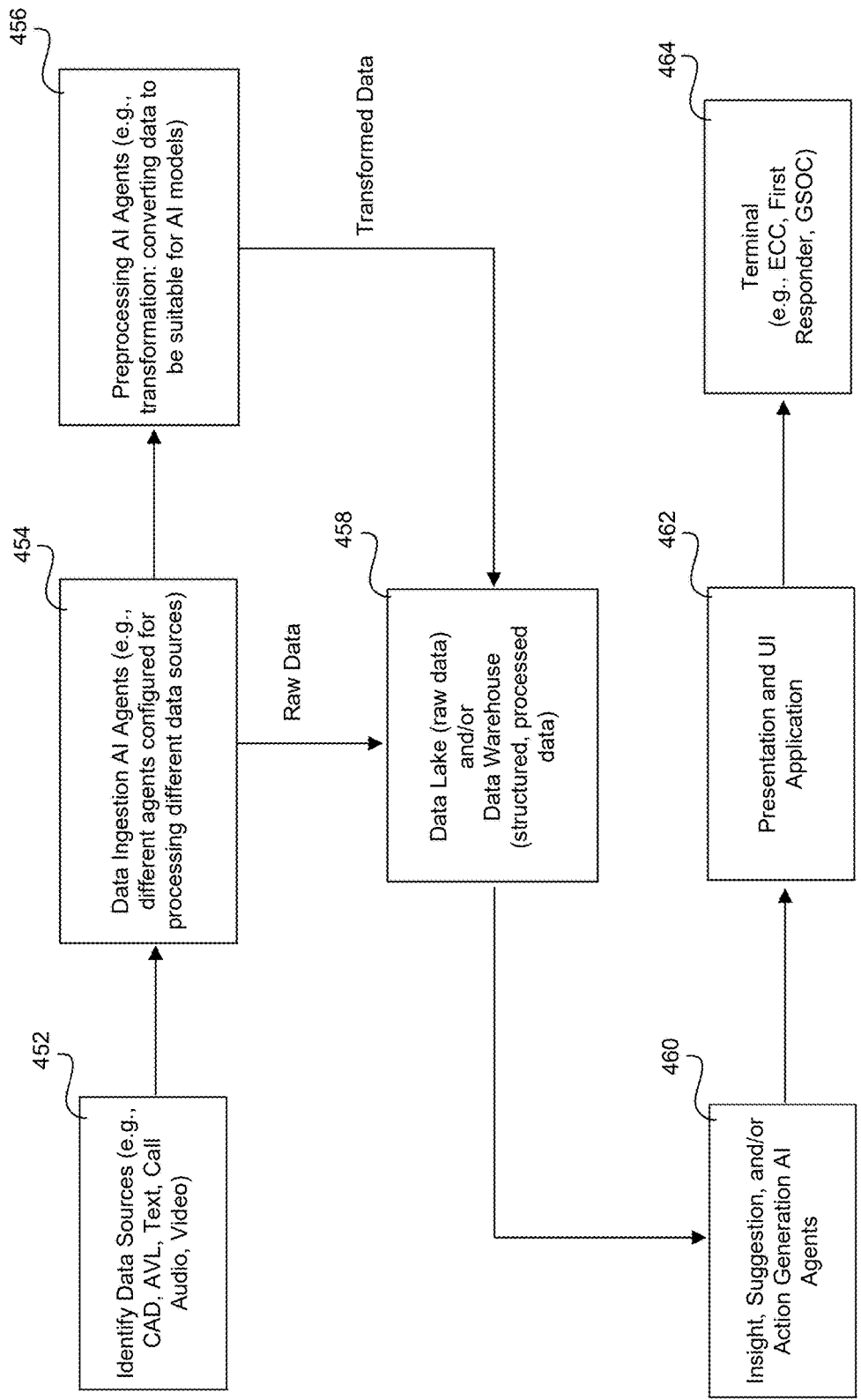
Figure 4C:
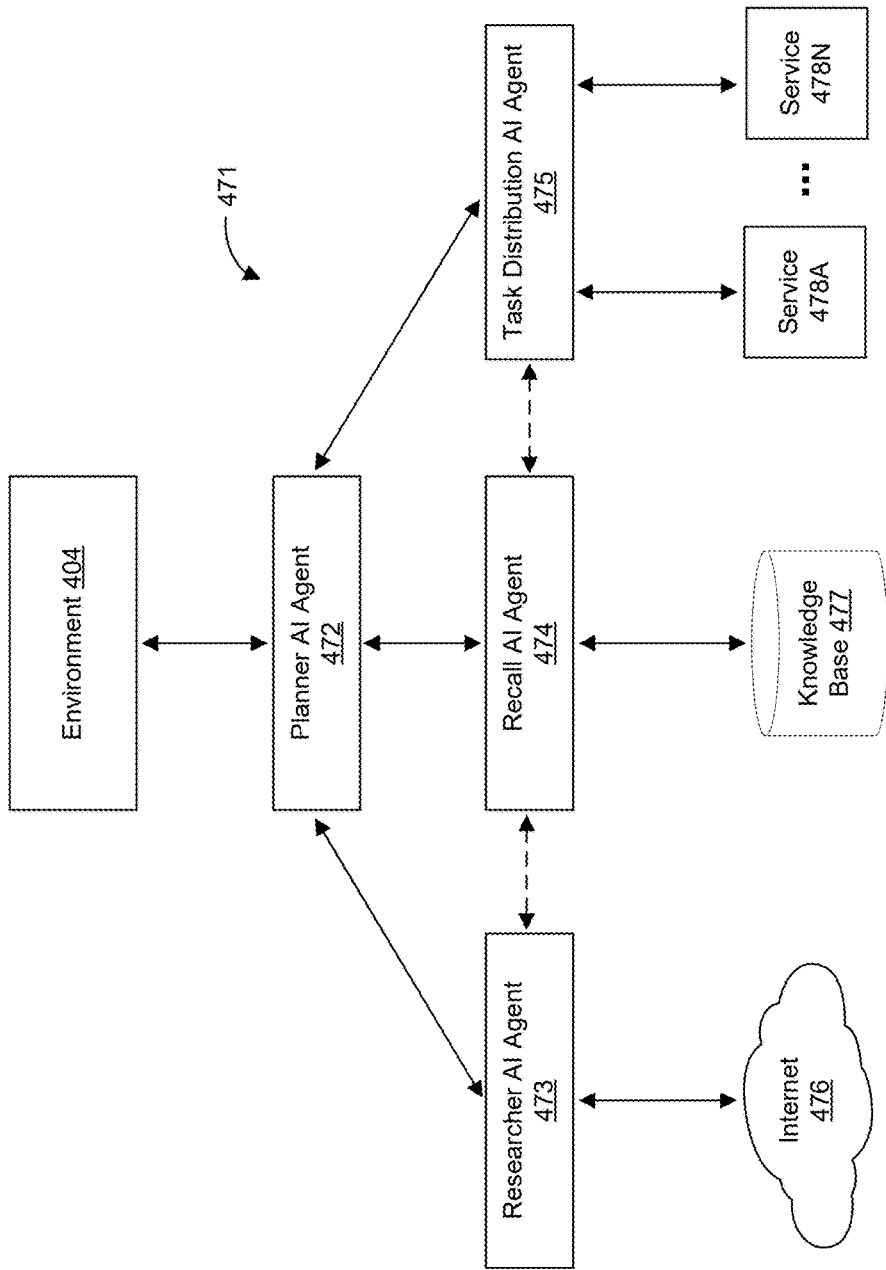

FIGS. 4A, 4B, and 4C illustrate example diagrams of emergency response agentic AI architectures, in accordance with aspects of the disclosure. FIG. 4A illustrates a block diagram of an emergency response agentic AI environment 400, in accordance with aspects of the disclosure. Emergency response agentic AI environment 400 is an example architecture of an AI agent 402 communicatively coupled with an environment 404 to generate, provide, and perform tasks 405, requests and responses 408, and/or actions 410 in response to, for example, receipt of data 406. Environment 404 may represent a combination of: one or more data sources 104, an emergency response data system 102 (shown in FIG. 1B), emergency management applications 124, ECC computing system 108, operations center computing system 110, first responder computing device 112, one or more services 411 (e.g., translation, transcription, statistics generation, etc.), and/or an end user computing system (e.g., a smartphone of a 911 caller), for example. An LLM alone may be able to perform one or more operations, comparisons, and/or determinations. However, an LLM (without additional logic) may be unable to search the Internet, determine the reasonableness of a result, or perform multi-step operations (e.g., queries). AI agents, by contrast, may be paired with a goal, objective, or motivation and may include one or more supporting modules and/or LLMs to perform complex and multi-step operations. AI agent 402 is an example implementation of an AI agent that is operable to receive, request, or otherwise acquire emergency response data 406 and to provide requests and responses 408, perform tasks 405, and/or perform actions 410 to improve emergency awareness (e.g., by providing reports related to analytics) and/or response.

AI agent 402 may include a number of modules or components operating in concert to perform one or more generalized or specialized tasks, in accordance with aspects of the disclosure. AI agent 402 may include modules or components operating in one or more execution/control layers 411, which may include distributed hardware and software across a variety of tools and services, in accordance with aspects of the disclosure. AI agent 402 may include a perception module 412, a knowledge module 414, a reasoning module 416, a tools module 417, a communication module 418, an action module 420, and a learning module 422. Each module may be implemented as a combination of libraries, classes, functions, subprograms, application modules, or other code or instructions that encapsulates specific functionality within AI agent 402, for example. As illustrated in perception module 412, each module may include one or more of API support, an LLM for performing specific information processing, rules (e.g., a rules engine) for determining/prioritizing subsequent operations, instructions, and/or prompts, in accordance with aspects of the disclosure.

Perception module 412 operates as a gateway to the surrounding world by acquiring data 406 from environment 404 through a variety of sensors or input channels, in accordance with aspects of the disclosure. Sensors can include, but are not limited to, physical devices (e.g., cameras, microphones, and tactile sensors for embodied agents) and/or software interfaces that capture digital information (e.g., emergency call traffic, network traffic, user input, or data streams), for example. Perception module 412 may be configured to transform data 406 (e.g., unstructured data) into structured and processed formats that can be readily understood and utilized by subsequent modules within AI agent 402. Data transformation operations may include operations such as signal processing, noise reduction, feature extraction, and/or object recognition or event detection, laying the groundwork for AI agent 402 to understand the current state and the dynamics of environment 404.

Knowledge module 414 operates as the persistent and repository of accumulated understanding for AI agent 402, according to an embodiment. Knowledge module 414 provides context for reasoning and decision-making. Knowledge module 414 may include one or more databases (e.g., a vector database) and may include structured and/or unstructured data, including factual data about the world, relationships between entities, rules governing behavior, past experiences, historical analytics and statistics for one or more ECCs, and data representing historical user interactions, patterns, and/or behaviors. The organization and representation of knowledge module 414 may include semantic networks, ontologies, relational databases, or symbolic representations. Knowledge module 414 enables AI agent 402 to access relevant information quickly, recall past events, understand the implications of new perceptions, and maintain a model of its operational domain. Knowledge module 414 is persistent and enables AI agent 402 to exhibit intelligent behavior that extends beyond immediate reactive responses.

Reasoning module 416 represents a cognitive engine that processes the information received from perception module 412 and retrieved from knowledge module 414 to derive new insights, solve problems, and formulate plans, for example. Reasoning module 416 may be configured to apply a variety of logical and probabilistic inference techniques, search algorithms, and planning strategies to analyze situations, predict outcomes, and make informed decisions. Reasoning module 416 might engage in tasks such as deductive reasoning to draw logical conclusions from known facts, inductive reasoning to generalize from observations, abductive reasoning to find the best explanations for events, or analogical reasoning to apply knowledge from past similar situations. The output of reasoning module 416 may be formatted as a set of conclusions, decisions, or plans of action that are then passed on to tools module 417 to leverage external services, communications module 418 to gain further clarification, and/or action module 420 for execution.

Tools module 417 is a module that delegates tasks 405 to one or more (external) services 411, according to an embodiment. Tools module 417 extends the capabilities of AI agent 402 beyond its inherent resources to perform tasks 405. Tools module 417 may be configured to receive instructions (e.g., from reasoning module 416) that identify a particular task, identify which tool or external service is well-suited or best-suited to handle the task, invoking external services, and returning the results to, for example reasoning module 416. Examples of tools requested (e.g., from services 411) may include, but are not limited to, translation service, transcription service, statistics generation service, mapping service, weather information service, social media monitoring service, traffic monitoring service, a video analysis service.

Communication module 418 facilitates the exchange of information between AI agent 402 and other entities, which can include other AI agents, human users, or external systems. Communication module 418 may be configured to encode and decode of message according to established communication protocols and formats. For human-agent interaction, Communication module 418 may use one or more LLMs to perform natural language processing to understand user commands and generate coherent responses, as well as use other modalities like visual cues or gestures. For agent-to-agent communication, standardized protocols and shared ontologies may be employed to support effective information sharing and coordination.

Action module 420 is operable to interface between AI agent 402 internal decision-making processes and interaction with or modification of environment 404. Action module 420 receives high-level plans or decisions generated by reasoning module 416 and translates the plans or decisions into concrete actions or outputs that the agent can execute. Examples of actions 410 may include dispatching first responders, dispatching drones, dispatching an air ambulance, providing notification of an emergency to another ECC, requesting resources from another ECC, displaying a graphical representation of analytics, displaying a notification of anomalous data or events, controlling motors, manipulating objects, sending messages, updating information, making API calls, or otherwise presenting information to a user. Action module 420 may be configured to consider physical or virtual capabilities and constraints of environment 404 to ensure that the intended actions are carried out effectively and safely. Feedback from the environment as a result of these actions may be routed back through perception module 412 to close the loop (e.g., between perception, action, and feedback) and enabling AI agent 402 to observe the consequences of actions 410.

Learning module 422 enables the AI agent to improve its performance and adapt to new situations over time, according to an embodiment. Learning module 422 is operable to analyze the outcomes of actions 410 and update knowledge module 414, reasoning module 416, and/or action module 420 based on experience. Learning module 422 may be implemented using a variety of machine learning techniques, including supervised learning to learn from labeled data, unsupervised learning to discover patterns in unlabeled data, and reinforcement learning to optimize behaviors through trial and error and reward signals. Learning module 422 enables AI agent 402 to refine modules, improve the accuracy of its predictions, improve decision-making policies, and become more proficient at achieving goals in dynamic and uncertain environments. Insights gained with learning module 422 are integrated back into knowledge module 414 and reasoning module 416, influencing future reasoning and action selection.

AI agent 402 may include one or more additional modules to support emergency response operations. For example, AI agent 402 may include a motivation module 424 and a sentiment module 428, and/or prompts 430.

Motivation module 424 may be operable to define the specific objectives, priorities, and internal configurations of AI agent 402, in an embodiment. Motivation module 424 guides the reasoning and action selection. Motivation module 424 goals can be explicitly programmed or learned through experience. Goals represent the internal states or signals that influence agent behavior and direct the agent towards achieving particular goals. By having a clear representation of goals and motivations, AI agent 402 can make more coherent and purposeful decisions, especially in complex and dynamic environments where multiple objectives might need to be balanced.

Prompts 430 represents a storage and mapping of prompts or instructions may be associated with each of the various modules, according to an embodiment. Prompts 430 can represent pre-determined lists of prompts that may be referenced by modules and/or updated by modules to support the intended operations of AI agent 402.

Execution/control layer 411 may include a number of operations components 432 that support the operations of other modules in AI agent 402. Operations components 432 may include, but are not limited to, a scheduler 434, a runtime environment 436, and logging and monitoring module 438. Scheduler 434 may operate as the coordinator or modular operations. Scheduler 434 may be configured to determine when and how different tasks or processes are executed and may be used to optimize resource utilization to ensure timely completion of goals. Runtime environment 436 may be configured to provide resources and context for AI agent 402 to operate, including access to data, libraries, and computational power, for example. Logging and monitoring module 438 may be configured to maintain a record of agent behavior and performance, track key metrics, identify potential issues or errors, and provide insights for debugging and improvement.

FIG. 4B illustrates a flow diagram of a process 450 for agentic AI handling of emergency response data, in accordance with aspects of the disclosure. Process 450 may be implemented by one or more aspects of the emergency response data system. Process 450 includes a number of operations; it is to be understood that one or more of the operations may be performed out of the described order and/or in parallel with other operations.

At operation 452, process 450 includes identifying data sources for emergency response data (e.g., data sources 104), according to an embodiment.

At operation 454, process 450 includes receiving emergency response data with one or more data ingestion AI agents, according to an embodiment. Each of the one or more AI agents may be configured to efficiently handle specific types or formats of data. Operation 454 may provide raw data to a data lake for storage and/or further processing.

At operation 456, process 450 includes conditioning the emergency response data with one or more preprocessing AI agents, according to an embodiment. Operation 456 may provide structured data to a data warehouse for storage and/or further processing.

At operation 458, process 450 includes storing the raw emergency response data in a data lake and/or the conditioned/transformed emergency response data in a data warehouse (e.g., vector database), according to an embodiment.

At operation 460, process 450 includes generating insights, suggestions, and/or actions with one or more AI agents, according to an embodiment.

At operation 462, process 450 includes presenting insights, suggestions, and/or actions with an application (e.g., emergency management applications 124), according to an embodiment.

At operation 464, process 450 includes displaying the application at a terminal of one or more of an ECC computing device, a first responder computing device, and/or an operations center (e.g., a GSOC), according to an embodiment.

FIG. 4C illustrates a block diagram of an emergency response agentic AI environment 400, in accordance with aspects of the disclosure. Emergency response agentic AI environment 400 illustrates an AI agent network 471 communicatively coupled to environment 404, in accordance with aspects of the disclosure. AI agent network 471 is an example of a simplified AI agent architecture that may be used to at least partially perform the operations of an AI assistant system (e.g., AI assistant system 116) and/or of an AI agent (e.g., AI agent 402, AI agent 522, etc.). AI agent network 471 may be configured as a data analyst for an ECC to provide insights and/or analytics, in accordance with aspects of the disclosure.

AI agent network 471 may include a planner AI agent 472, a researcher AI agent 473, a recall AI agent 474, a task distribution AI agent 475, as an embodiment of the disclosure. AI agent network 471 may include more AI agents or fewer AI agents, depending upon the implementation. Planner AI agent 472, researcher AI agent 473, recall AI agent 474, and task distribution AI agent 475 are communicatively coupled to each other to perform coordinated operations of AI agent network 471, according to an embodiment. Planner AI agent 472, researcher AI agent 473, recall AI agent 474, and task distribution AI agent 475 may be individually (at least partially) implemented using different (or the same) AI services or LLMs, such as: Gemini 2.5, Claud 3.7 from Anthropic, Qwen 2.5, GPT 4.0, and the like.

Planner AI agent 472 is operable to interface with environment 404 to determine tasks and delegate or distribute sub-tasks to one or more supporting AI agents, according to an embodiment. Planner AI agent 472 may also include instructions to validate the quality of information or tasks provided by the supporting AI agents.

Researcher AI agent 473 is operable to receive tasks from planner AI agent 472 that are related to Internet-based research, according to an embodiment of the disclosure. Researcher AI agent 473 is communicatively coupled to Internet 476 and includes instructions for searching Internet 476 to fulfill tasks received from planner AI agent 472, in an embodiment.

Recall AI agent 474 is operable to receive tasks from planner AI agent 472 that are related to Internet-based research, according to an embodiment of the disclosure. Recall AI agent 474 is communicatively coupled to knowledge base 477 and includes instructions for analyzing and recalling information (e.g., standard operating procedures) from one or more databases, in an embodiment.

Task distribution AI agent 475 is operable to receive tasks from planner AI agent 472 that are related to Internet-based research, according to an embodiment of the disclosure. Task distribution AI agent 475 is communicatively coupled to one or more services 478 (inclusive of services 478A to 478N) for distributing tasks to various services and/or LLMs.

AI agent network 471 showcases a modular architecture for coordinated operations, enabling efficient information gathering, analysis, and task delegation. The disclosed configuration highlights the potential of interconnected AI agents to advantageously enhance emergency response capabilities by leveraging web resources, internal knowledge bases, and external services.

Figure 5:
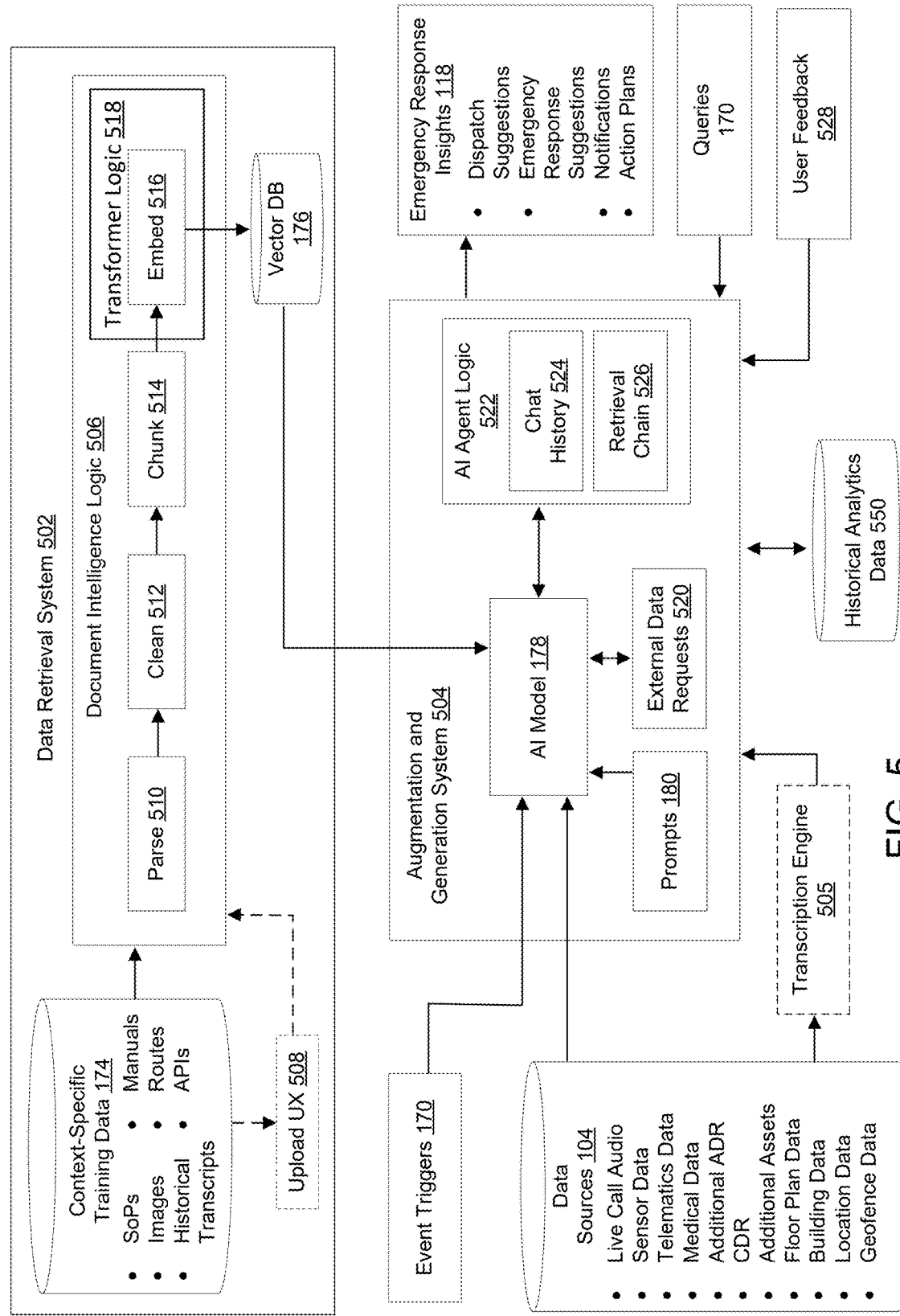
FIG. 5 illustrates a diagram of an emergency response retrieval, augmentation, and generation (RAG) system, in accordance with embodiments of the disclosure.

FIG. 5 illustrates an example of a block diagram of an emergency response RAG system 500 that is configured to retrieve, aggregate, and analyze information to generate insights and/or analytics that can be extracted from aggregated information to reduce emergency response times, increase safety of first responders, and improve ECC operations, in accordance with aspects of the disclosure. Emergency response RAG system 500 is an example implementation of RAG system 162 (shown in FIG. 1B), according to an embodiment. Emergency response RAG system 500 is an example implementation of the AI assistant system disclosed herein and may be used in coordination with one or more AI agents, in accordance with aspects of the disclosure. Emergency response RAG system 500 includes a data retrieval system 502 and an augmentation and generation system 504, according to an embodiment. The data retrieval system 502 and augmentation generation system 504 work in concert to provide emergency response insights 118 and analytics that are based on context-specific training data 174, characteristics of call data, characteristics of trigger events 170, data sources 104, and/or historical ECC analytics data 550, according to embodiments.

Data retrieval system 502 includes document intelligence logic 506 that is configured to condition context-specific training data 174 into numerical representations that can be stored and searched in vector database 176, according to an embodiment. In one embodiment, emergency response RAG system 500 provides an upload UI 508 that enables users to selectively provide relevant training data 174 for conditioning and upload into vector database 176.

Document intelligence logic 506 may be configured to perform a number of operations on context-specific training data 174 to convert training data 174 into semantically correlated vectors that are stored in vector database 176, according to an embodiment. Document intelligence logic 506 may include a parse operation 510, a clean operation 512, a chunk operation 514, and an embed operation 516, according to an embodiment. Although document intelligence logic 506 is represented as a single category of logic, the various operations may be performed by one or more independent tools, scripts, or software programs. Parse operation 510 includes processing raw input data (e.g., text, documents, images, or web pages) to extract meaningful information. This may include reading various formats (e.g., HTML, PDF, etc.), tokenizing, and extracting useful text. Parse operation 510 includes breaking down the source material into a format that can be processed in subsequent stages by, for example, understanding the structure of raw data and extracting relevant content from it. Clean operation 512 includes refining the parsed data to remove noise, redundant information, or irrelevant content. This could involve normalizing text (like converting to lowercase), removing special characters, filtering out stop words, and correcting formatting issues. Clean operation 512 further conditions the data to be high-quality and relevant as possible for embedding. Chunk operation 514 includes breaking the cleaned data into smaller, manageable pieces or "chunks" that are suitable for further processing. Since large documents or long text segments may be difficult to process in one go, chunking can condition the data so that the data can fit into the input size limitations of the AI model (e.g., AI model 178) and can be retrieved efficiently. Chunk operation 514 divides data into pieces that the AI model can handle within its capacity, which may be based on the token limit for the AI model. Embed operation 516 includes converting the chunks of data into numerical vectors (embeddings) using a neural network or language model. The embeddings may capture the semantic meaning of the chunks and enable efficient comparison and retrieval (e.g., during a vector search). During the RAG process, embeddings of both the query and the data are compared to retrieve the most relevant chunks. Embed operation 516 generally relates to transforming data into a machine-readable format (vectors) that the AI model can use to identify relevant information based on (semantic) similarity. Embed operation 516 may be performed by transformer logic 518, according to an embodiment. Transformer logic 518 may be an LLM or AI model configured to perform embedding operations, according to an embodiment.

Augmentation generation system 504 selectively queries vector database 176 and generates emergency response insights 118, based on one or more of the content of vector database 176, data sources 104, and/or one or more trigger events 170 (e.g., characteristics of call audio to an ECC, GSOC, rail NOC, etc.), according to an embodiment. Augmentation and generation system 504 includes AI model 178, prompts 180, external data requests 520, and AI agent logic 522, according to an embodiment. External data requests 520 may include API requests to traffic feeds (e.g., Waze API), weather feeds (e.g., Tomorrow.io), social media feed, public record searches, or the like. External data requests 520 may be used to further enrich the generation of emergency response insights 118.

AI agent logic 522 represents scripts, decision trees, processes, and instructions that may be part of AI model 178 or that may complement AI model 178 in interacting with a user (e.g., dispatcher, telecommunicator, operations center operator, first responder, etc.), according to an embodiment. AI agent logic 522 may include one or more of the agentic AI architectures and/or processes disclosed herein. AI agent logic 522 may include live assistant logic 160 (shown in FIG. 1B) or may be a subset of live assistant logic 160. AI agent logic may be configured to at least partially perform one or more of the disclosed processes, in accordance with aspects of the disclosure. AI agent logic 522 may maintain chat history 524 to provide context to subsequently provided emergency response insights 118. AI agent logic 522 may be based on a retrieval chain 526 that may include a sequence of steps or processes involved in fetching relevant information from a large corpus or database to answer a query. In the context of a RAG architecture, a retrieval chain includes operations that help gather and rank the documents or data snippets.

Emergency response RAG system 500 may include a transcription engine 500, according to embodiments of the disclosure. Transcription engine 500 may receive various types of audio (e.g., live 911 calls, live operations centers calls, first responder calls, over the air radio dispatch audio, audible first responder queries, etc.) and may provide transcripts to augmentation and generation system 504 to support the generation of emergency response insights 118, for example.

Emergency response RAG system 500 may also receive and operate based on user feedback 528, according to an embodiment. User feedback 528 may indicate that a dispatcher determinate code appears incorrect, that an address appears incorrect, that instructions or suggestions are unclear, or that an automated action is not to be performed in the future. User feedback 528 may be stored in a data structure and/or may be included in chat history 524 to provide context for subsequently generated emergency response insights 118.

Emergency response RAG system 500 may search the vector database in response to receiving one or more queries 172, according to an embodiment. The search may be performed without a call-based trigger and/or without a data-based trigger, and receipt of the one or more queries 172 may trigger execution of the AI assistant workflow, inclusive of one or more processes disclosed herein, in accordance with various embodiments of the disclosure.

Figure 6:
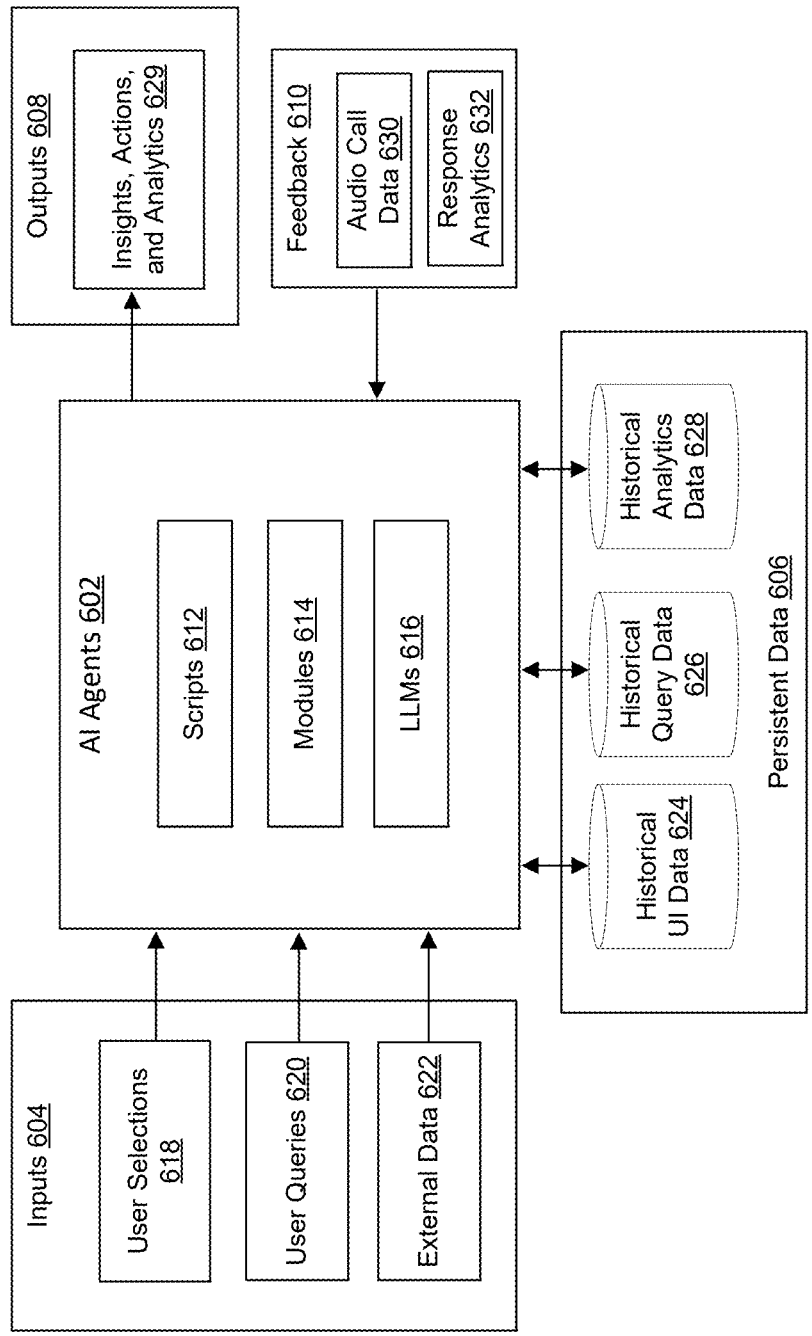
FIG. 6 illustrates an example diagram of an agentic AI emergency response system, in accordance with embodiments of the disclosure.

FIG. 6 illustrates a diagram of an agentic AI emergency response system 600 that includes a number of agents that are operable to generate analytics and/or provide an interface to historical and/or forecasted data of one or more ECCs, in accordance with aspects of the disclosure. Agentic AI emergency response system 600 may include AI agents 602, inputs 604, persistent data 606, outputs 608 and feedback 610, according to an embodiment. AI agents 602 may include scripts 612, modules 614, and/or LLMs 616. Inputs 604 may include user selections 618, user queries 620, and/or external data 622. Persistent data 606 may include historical user interface (UI) data 624, historical query data 626, and historical analytics data 628 stored in one or more tables, databases, and/or other data structures. Outputs 608 may include, but are not limited to, insights, actions, and analytics 629. AI agents 602 may be operable and/or configured to perform self-improvement operations based on feedback 610. Feedback 610 may include audio call data 630 (e.g., live 911 call data) and response analytics 632 (e.g., metrics around the time between receipt of a 911 call and dispatch of appropriate first responders to the location of an emergency).

Figure 7:
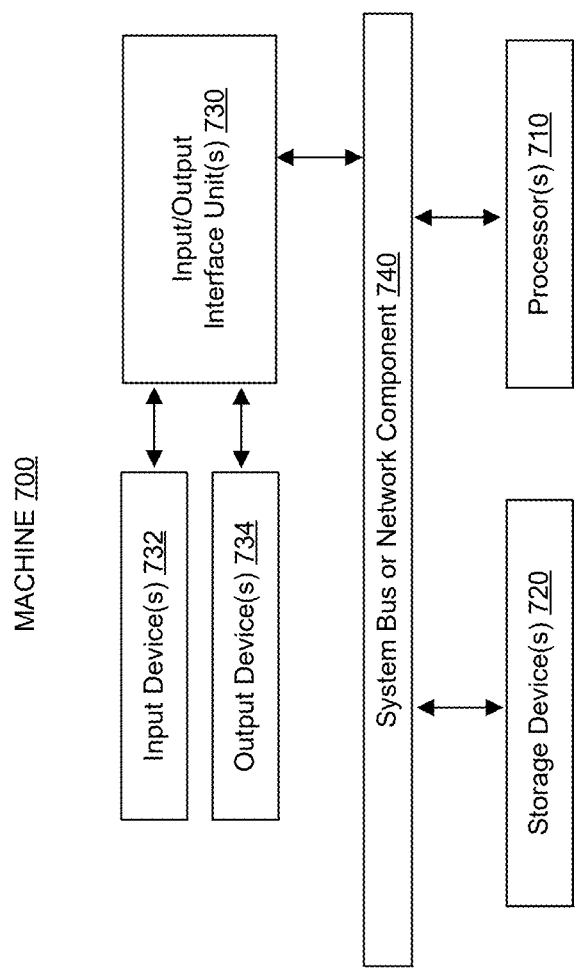
FIG. 7 illustrates an example diagram of a machine, in accordance with embodiments of the disclosure.

FIG. 7 is a high-level block diagram of a machine 700 that may be used to implement one or more of the operations, devices, and/or systems disclosed herein. Machine 700 includes one or more processors 710, one or more input/output interface units 730, one or more storage devices 720, and one or more system buses and/or network components 740 for facilitating the communication of information among the coupled elements. One or more input devices 732 and one or more output devices 734 may be communicatively coupled to the one or more input/output interfaces 730.

The one or more processors 710 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present disclosure. At least a portion of the machine executable instructions may be stored (temporarily or more permanently) on the one or more storage devices 720 (e.g., non-transitory computer-readable medium) and/or may be received from an external source via one or more input interface unit 730.

In one embodiment, machine 700 may be one or more conventional personal computers, servers, distributed computing systems, augmented reality devices, virtual reality devices, wearable systems, and/or computing devices. The processors 710 may be one or more microprocessors. The bus 740 may include a system bus. The storage devices 720 may include system memory, such as read only memory (ROM) and/or random access memory (RAM). The storage devices 720 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 732, such as a keyboard and pointing device (e.g., a mouse) for example. Other input devices such as a microphone, a joystick, an image sensor, a game pad, a satellite dish, a scanner, or the like, may also (or alternatively) be included. These and other input devices are often connected to the processing unit(s) 710 through an appropriate interface 730 coupled to the system bus 740. The output devices 734 may include a monitor or other type of display device, which may also be connected to the system bus 740 via an appropriate interface.

Figure 8:
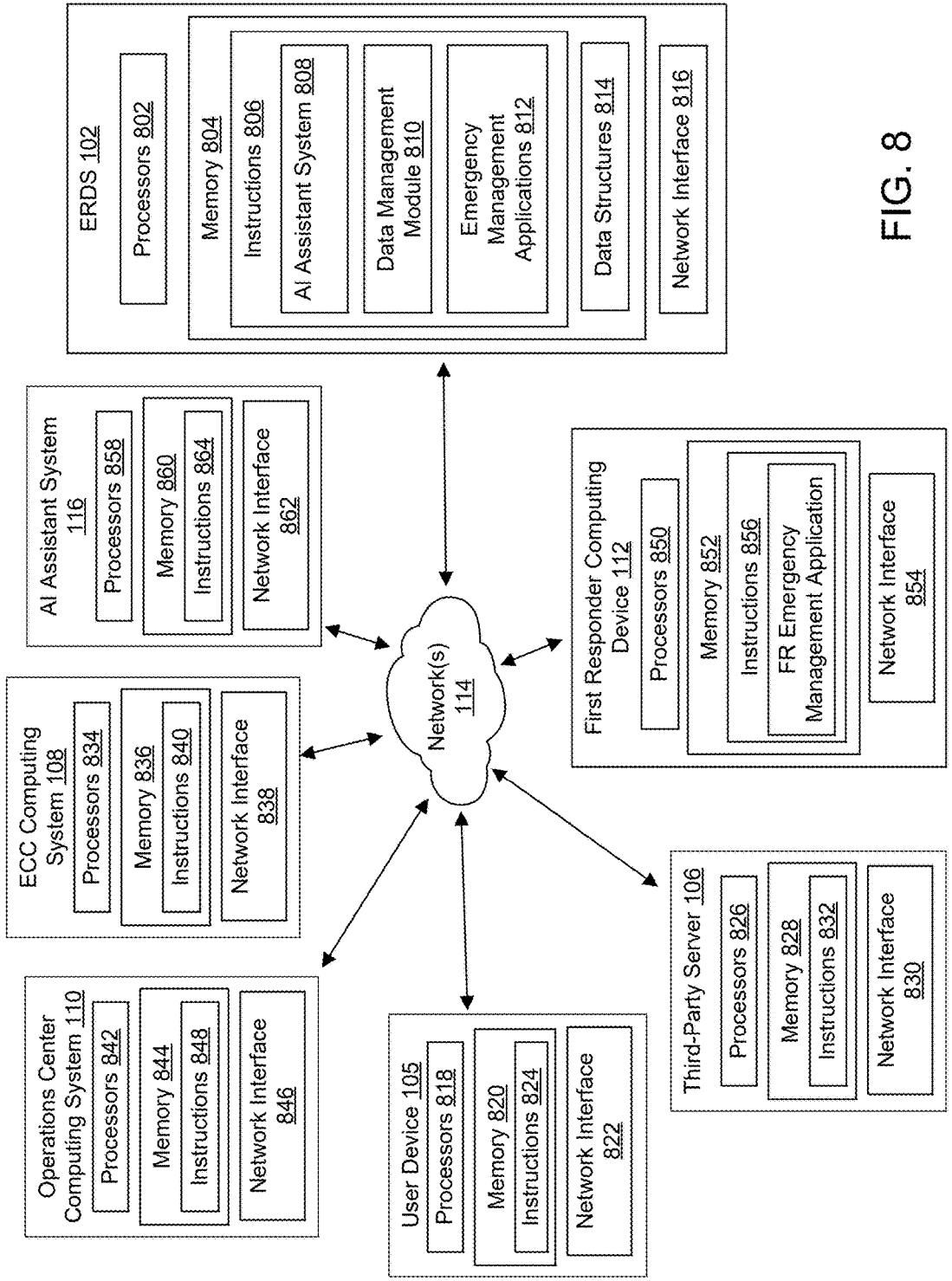
FIG. 8 illustrates an example diagram of an emergency response digital assistant system, in accordance with embodiments of the disclosure.

FIG. 8 illustrates an example diagram of an emergency response digital assistant system 800, in accordance with aspects of the disclosure. Emergency response digital assistant system 800 includes processing logic, (computer-readable) instructions, and memory that may be distributed across servers, one or more computing centers, and/or one or more cloud computing centers, according to various implementations of the disclosure. Emergency response digital assistant system 800 may include emergency response data system 102, user device 105, third-party server 106, ECC computing system 108, operations center computing system 110, first responder computing device 112, and RAG system 162 communicatively coupled to each other through one or more networks 114, which may each be an example implementation of machine 700 (shown in FIG. 7), in accordance with various embodiments of the disclosure.

Emergency response data system (ERDS) 102 may include one or more processors 802, memory 804, and network interface 816 to support operations. Memory 804 may store instructions 806 that may be executed by processors 802, according to an embodiment. Instructions 806 may include one or more aspects of an AI assistant system 808, a data management module 810, and emergency management applications 812. One or more data structures 814 to support operations of ERDS 102.

User device 105 may include one or more processors 818, memory 820, and network interface 822 to support operations. Memory 820 may store instructions 824 that may be executed by processors 802, according to an embodiment.

Third-party server 106 may include one or more processors 826, memory 828, and network interface 830 to support operations. Memory 828 may store instructions 832 that may be executed by processors 826, according to an embodiment.

ECC computing system 108 may include one or more processors 834, memory 836, and network interface 838 to support operations. Memory 836 may store instructions 840 that may be executed by processors 834 to support operation of an ECC emergency management application, according to an embodiment.

Operations center computing system 110 may include one or more processors 842, memory 844, and network interface 846 to support operations. Memory 844 may store instructions 848 that may be executed by processors 842 to support operation of an operations center emergency management application, according to an embodiment.

First responder computing device 112 may include one or more processors 850, memory 852, and network interface 854 to support operations. Memory 852 may store instructions 856 that may be executed by processors 850 to support operation of a first responder emergency management application, according to an embodiment.

AI assistant system 116 may include one or more processors 858, memory 860, and network interface 862 to support operations. Memory 860 may store instructions 864 that may be executed by processors 858 to run one or more aspects of AI operations, according to an embodiment.

Figure 9:
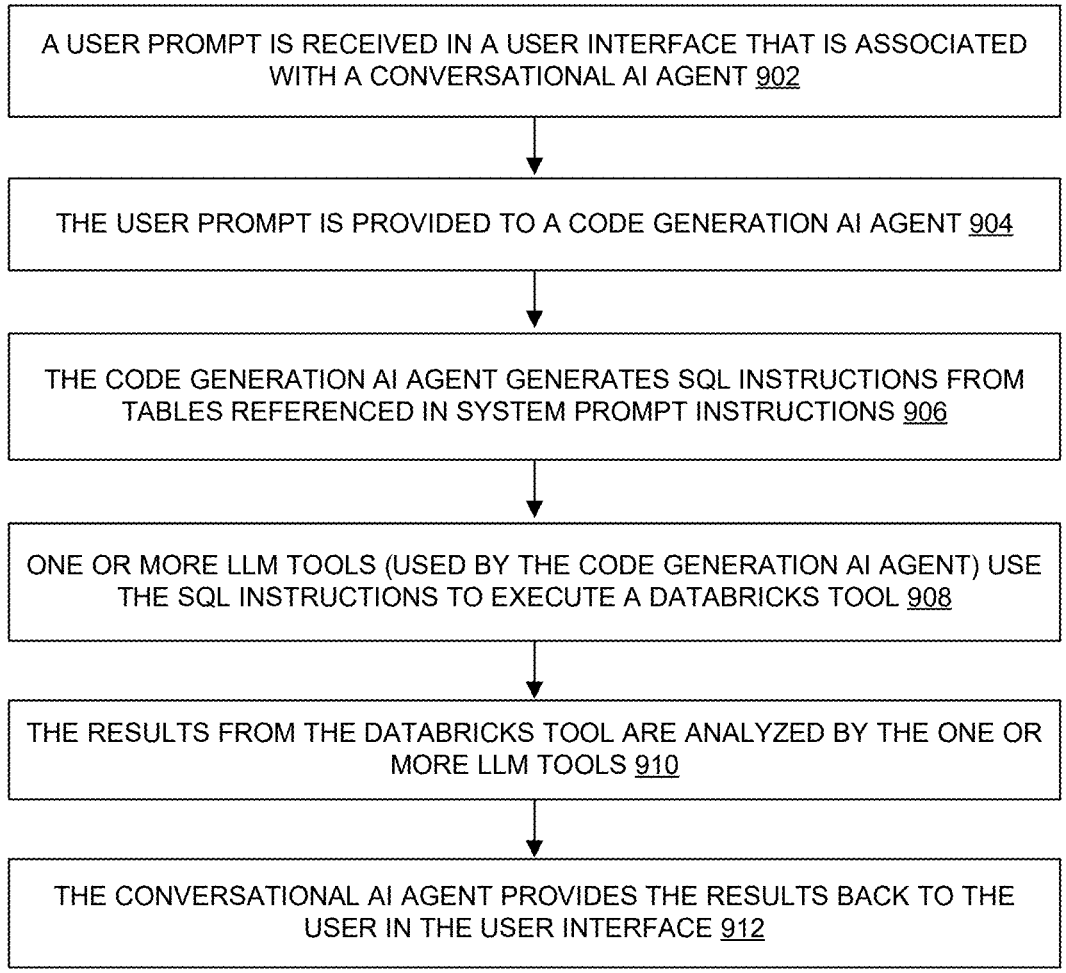
FIG. 9 illustrates an example flow diagram of a process for providing emergency response analytics using AI queries in emergency management applications, in accordance with embodiments of the disclosure.

FIG. 9 illustrates a flow diagram of a process 900 for providing emergency response analytics using AI queries in emergency management applications, in accordance with aspects of the disclosure. Process 900 may be implemented by one or more aspects of the emergency response data system (e.g., the AI assistant system, one or more AI agents, one or more LLMs, etc.). Process 900 includes a number of operations; it is to be understood that one or more of the operations may be performed out of the described order and/or in parallel with other operations.

At operation 902, a user prompt is received in a user interface (e.g., of an emergency management application) that is associated with a conversational AI agent, according to an embodiment.

At operation 904, the user prompt is provided to a code generation AI agent, according to an embodiment.

At operation 906, the code generation AI agent generates SQL instructions from tables referenced in system prompt instructions, according to an embodiment.

At operation 908, one or more LLM tools (e.g., used by the code generation AI agent) use the SQL instructions to execute a Databricks® tool, according to an embodiment.

At operation 910, the results from the Databricks® tool are analyzed by the one or more LLM tools, according to an embodiment.

At operation 912, the conversation AI agent provides the results back to the user in the user interface, according to an embodiment.

FIG. 10 illustrates a diagram of instructions 1000 that may be provided to configure an AI agent to operate as an analytics assistant for emergency response management, according to an embodiment. Instructions 1000 include example aspects of AI prompts that may be used to configure an AI agent in an AI assistant system. Instructions 1000 include a prompt 1002. Prompt 1002 may include a system prompt for a conversational or planner AI agent. Some of prompt 1002 may be applied to specific LLMs or sub-agents of a system-level agent. Prompt 1002 may include a role description 1004 that defines the role of the LLM or AI agent. Prompt 1002 may include a context description 1006 and parameters 1008, in accordance with aspects of the disclosure.

Figure 11B:
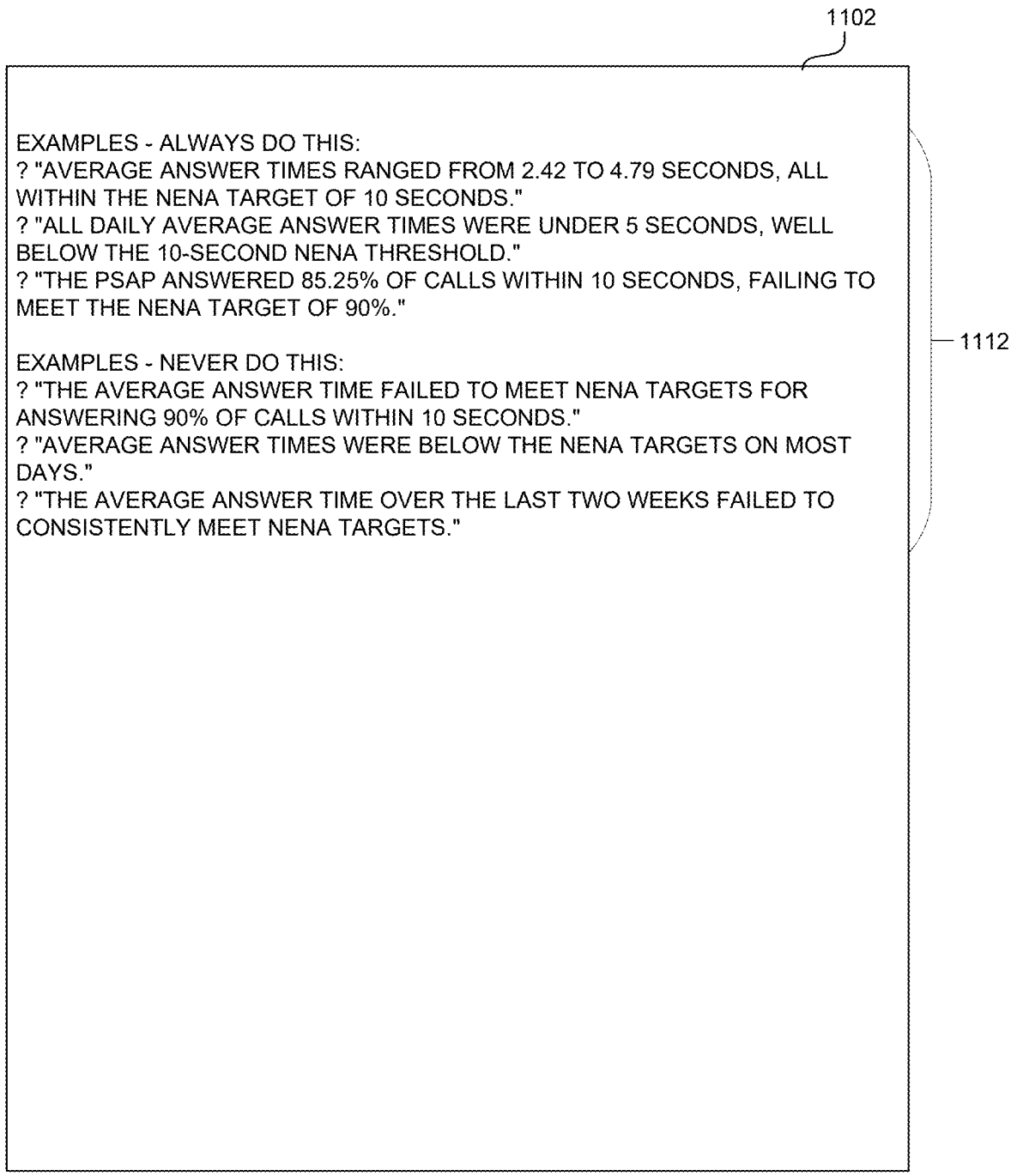

FIGS. 11A and 11B illustrate diagrams of instructions 1100 that may be provided to configure an AI agent to operate as an analytics assistant for emergency response management, according to an embodiment. Instructions 1100 include example aspects of AI prompts that may be used to configure an AI agent in an AI assistant system. Instructions 1100 may be used in conjunction with instructions 1000 to configure one or more LLMs and/or AI agents to operate as an analytics assistant supporting emergency response management. Instructions 1100 include prompt 1102. Prompt 1102 may include a role description 1104, context description 1106, task description 1108, parameters 1110, output examples 1112, for example. Output examples 1112 may include positive output example and negative (e.g., undesirable) output examples.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded with the widest scope consistent with this disclosure, the principles and the novel features disclosed herein.

The term "logic" and/or "processing logic" in this disclosure may include one or more processors, microprocessors, multi-core processors, application-specific integrated circuits (ASIC), and/or field programmable gate arrays (FPGAs) to execute operations disclosed herein. In some embodiments, memory may be integrated into the logic to store instructions to execute operations and/or store data. Logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device or system may include a desktop computer, a laptop computer, a tablet, a phablet, a smartphone, a feature phone, a server computer, or otherwise. A server computing system may be located remotely in a data center, may be stored locally, and/or may have components (e.g., processors, memory, network interfaces, etc.) that are distributed across one or more locations.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application-specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An emergency response data system operable to provide an artificial intelligence (AI) agent to generate emergency response analytics, comprising:
    memory having instructions; and one or more processors coupled to the memory and operable to execute the instructions to perform one or more operations, comprising:
  provide an emergency management application operable by an emergency communications center (ECC) computing system to display an emergency management user interface (UI) at one of a plurality of ECCs,
    wherein the emergency management application includes an emergency response AI agent,
  store, in one or more data structures, historical emergency response analytics;
  receive, with the emergency management UI, user instructions related to the historical emergency response analytics;
  provide the user instructions to the emergency response AI agent;
  generate, with the emergency response AI agent, visualizations of the historical emergency response analytics; and
  display, with the emergency management UI, the visualizations of the historical emergency response analytics to facilitate operational efficiency of the one of the plurality of ECCs.

2. The emergency response data system of claim 1, wherein the user instructions include verbal queries spoken into an audio interface or include text-based queries entered into a UI window in the emergency management UI.

3. The emergency response data system of claim 2, wherein the emergency response AI agent provides text-based responses interleaved between portions of the text-based queries in the UI window to provide a conversational interface.

4. The emergency response data system of claim 3, wherein the UI window includes a query save button and a message box operable to receive a query name for the text-based queries, wherein the emergency management application associates the text-based queries with the query name in response to selection of the query save button by a user.

5. The emergency response data system of claim 2, wherein the UI window includes a saved queries menu, wherein the UI window displays a list of saved queries in response to selection of the saved queries menu.

6. The emergency response data system of claim 5, wherein at least one of the saved queries is a multi-step query that includes a plurality of tasks grouped together.

7. The emergency response data system of claim 5, wherein the user instructions include selection of at least one of the saved queries from the list of saved queries.

8. The emergency response data system of claim 1, wherein the user instructions include selection of an auto AI insights button that is operable to instruct the emergency response AI agent to generate insights into the historical emergency response analytics.

9. The emergency response data system of claim 8, wherein the emergency response AI agent is operable to retrieve data from one or more data sources that are external to the emergency response data system, wherein the emergency response AI agent generates the insights at least partially based on the data from the one or more data sources.

10. The emergency response data system of claim 9, wherein the one or more data sources include at least one of live call audio of a 911 call, sensor data, telematics data, medical data, floor plan data, building data, ambient conditions data, public records data, traffic data, or weather data.

11. The emergency response data system of claim 1, wherein the visualizations of the historical emergency response analytics, include at least one of graphs, charts, plots, histograms, tables, or statistics windows.

12. The emergency response data system of claim 1, wherein the user instructions include selection of a generate AI chart button that is operable to instruct the emergency response AI agent to automatedly generate the visualization of the historical emergency response analytics as at least one of a graph, a chart, a plot, a histogram, a table, or a statistics window.

13. The emergency response data system of claim 12, wherein the user instructions include at least one of temporal filter instructions or spatial filter instructions within the emergency management UI.

14. The emergency response data system of claim 1, wherein the user instructions include selection of an AI forecast button that is operable to instruct the emergency response AI agent to generate a predictive forecast of the historical emergency response analytics.

15. The emergency response data system of claim 14, wherein the predicative forecast of the historical emergency response analytics is at least partially based on data retrieved from external data sources.

16. The emergency response data system of claim 1, wherein the user instructions include selection of an AI insights button that is operable to instruct the emergency response AI agent to generate notification alerts of anomalous data values or anomalous data patterns in response to detection of anomalous emergency response analytics.

17. The emergency response data system of claim 16, wherein the notification alerts include a pop-up window overlaid onto the emergency management UI to inform a user of detected anomalies.

18. The emergency response data system of claim 1, wherein the emergency response AI agent is configured with at least one of a role prompt, a context prompt, a parameters prompt or an examples prompt, wherein the role prompt defines a role of a data analyst of emergency response data to the emergency response AI agent, wherein the parameters prompt defines emergency response parameters used by some of the plurality of ECCs.

19. The emergency response data system of claim 1, wherein the user instructions include selection of a custom report button that provides instructions to the emergency response AI agent to generate a report that is compliant with at least one of a city council, a state agency, a federal agency, or a federal communications commission (FCC).

20. The emergency response data system of claim 1, wherein the one or more operations further comprise:
  store prior user instructions to the emergency response AI agent,
    wherein the prior user instructions include prior queries,
    wherein the user instructions include a partial query,
  wherein the emergency response AI agent is operable to generate potential query completion suggestions for the partial query at least partially based on the prior user instructions to the emergency response AI agent; and
  display a list of the potential query completion suggestions with the partial query in the emergency management UI.

21. The emergency response data system of claim 1, wherein the one or more operations further comprise:
  receive prior user interactions with the emergency management UI;
  store the prior user interactions with the emergency management UI, wherein the prior user interactions include cursor locations within the emergency management UI;
receive live user interactions with the emergency management UI;
provide live user interactions data to the emergency response AI agent to generate potential action suggestions, wherein the live user interactions data is representative of the live user interactions; and
display a list of the potential action suggestions within the emergency management UI to enable selection of one of the potential action suggestions from the list of the potential action suggestions.

22. The emergency response data system of claim 1, wherein the one or more operations further comprise:
capture call audio data for 911 calls to the one of the plurality of ECCs;
provide the call audio data to the emergency response AI agent;
provide instructions to the emergency response AI agent to determine a sentiment of a 911 caller within the call audio data;
compare the sentiment of the 911 caller within the call audio data to AI-generated insights or to AI-generated action suggestions to determine a level of relevance of the AI-generated insights or of the AI-generated action suggestions; and
provide the level of relevance as feedback to the emergency response AI agent to train the emergency response AI agent.

23. The emergency response data system of claim 22, wherein the call audio data includes transcripts of 911 call audio represented by the call audio data.

24. The emergency response data system of claim 1, wherein the emergency response AI agent includes an AI agent network of a plurality of AI agents, wherein the plurality of AI agents includes a planner AI agent, a researcher AI agent, and a recall AI agent communicatively coupled together.

25. The emergency response data system of claim 24, wherein the researcher AI agent is configured to receive and respond to first research tasks received from the planner AI agent, wherein the first research tasks include Internet research, wherein the recall AI agent is configured to receive and respond to second research tasks received from the planner AI agent, wherein the second research tasks include historical emergency response data research.

26. The emergency response data system of claim 24, wherein at least one of the plurality of AI agents includes a large language model (LLM).

27. The emergency response data system of claim 1, wherein the emergency response AI agent includes a plurality of AI agents, wherein the plurality of AI agents are operable to ingress a plurality of data types into the emergency management application, wherein a first of the plurality of AI agents is configured to receive and process audio-formatted data, wherein a second of the plurality of AI agents is configured to receive and process image-formatted data, wherein a third of the plurality of AI agents is configured to receive and process video-formatted data.

28. A method of providing emergency response analytics with an artificial intelligence (AI) agent integrated into an emergency response data system, comprising:
providing an emergency management application operable by an emergency communications center (ECC) computing system to display an emergency management user interface (UI) at one of a plurality of ECCs, wherein the emergency management application includes an emergency response AI agent,
storing, in one or more data structures, historical emergency response analytics;
receiving, with the emergency management UI, user instructions related to the historical emergency response analytics;
providing the user instructions to the emergency response AI agent;
generating, with the emergency response AI agent, textual or visual representations of the historical emergency response analytics in response to the user instructions; and
displaying, with the emergency management UI, the textual or visual representations of the historical emergency response analytics to facilitate operational efficiency of the one of the plurality of ECCs.

29. The method of claim 28, further comprising:
retrieving, with the emergency response AI agent, data from one or more data sources that are external to the emergency response data system; and
generating, with the emergency response AI agent, insights into the historical emergency response analytics at least partially based on the data from the one or more data sources,
wherein the one or more data sources include at least one of live call audio of a 911 call, sensor data, telematics data, medical data, floor plan data, building data, ambient conditions data, public records data, traffic data, or weather data.

* * * * *